US009971535B2

United States Patent
Wang

(10) Patent No.: US 9,971,535 B2
(45) Date of Patent: May 15, 2018

(54) CONVERSION METHOD FOR REDUCING POWER CONSUMPTION AND COMPUTING APPARATUS USING THE SAME

(71) Applicant: Industrial Technology Research Institute, Hsinchu (TW)

(72) Inventor: Mao-Yin Wang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 440 days.

(21) Appl. No.: 14/533,094

(22) Filed: Nov. 5, 2014

(65) Prior Publication Data

US 2016/0124671 A1    May 5, 2016

(51) Int. Cl.
*G06F 3/06* (2006.01)
*G06F 1/32* (2006.01)
(Continued)

(52) U.S. Cl.
CPC .......... *G06F 3/0625* (2013.01); *G06F 1/3268* (2013.01); *G06F 3/0644* (2013.01);
(Continued)

(58) Field of Classification Search
CPC .... G06F 1/329; G06F 3/0625; G06F 9/30032; G06F 9/30043; G06F 9/30076; G06F 9/442
See application file for complete search history.

(56) References Cited

U.S. PATENT DOCUMENTS 5,638,525 A * 6/1997 Hammond .......... G06F 9/30043
712/209
7,539,884 B2  5/2009 You et al.
(Continued)

FOREIGN PATENT DOCUMENTS

CN    101109985    1/2008
CN    101515976    8/2009
(Continued)

OTHER PUBLICATIONS

Ikebuchi et al., "Geyser-1: A MIPS R3000 CPU core with fine-grained run-time Power Gating," 2010 15th Asia and South Pacific Design Automation Conference (ASP-DAC), Jan. 18-21, 2010, pp. 369-370.
Zhao et al., "Geyser-2: The second prototype CPU with fine-grained run-time Power Gating," 2011 16th Asia and South Pacific Design Automation Conference (ASP-DAC), Jan. 25-28, 2011, pp. 87-88.
Arakawa et al., "Implementation of Normally-off Function for TOPPERS/ASP Kernel," 2013 IEEE 2nd Global Conference on Consumer Electronics (GCCE), Oct. 1-4, 2013, pp. 85-89.
Wang et al., "A Compression-based Area-efficient Recovery Architecture for Nonvolatile Processors," Design, Automation & Test in Europe Conference & Exhibition (DATE), Mar. 12-16, 2012, pp. 1519-1524.
(Continued)

*Primary Examiner* — Terrell S Johnson
(74) *Attorney, Agent, or Firm* — JCIPRNET

(57) ABSTRACT

A conversion method for reducing power consumption and computing apparatus using the same are introduced. The computing apparatus includes a conversion unit, a data storage unit and an instruction processing unit. The conversion unit receives a first instruction sequence. In a power saving mode, the conversion unit combines a second instruction sequence having the same function as the first instruction sequence with at least one specific instruction to obtain and output a third instruction sequence. The at least one specific instruction does not belong to an instruction set each instruction included in the first instruction sequence belongs to. The data storage unit includes a volatile part and a non-volatile part. The instruction processing unit is coupled to the conversion unit and the data storage unit, processes the third instruction sequence and manages a storage state of the data storage unit according to the at least one specific instruction.

30 Claims, 14 Drawing Sheets

(51) Int. Cl.
*G06F 9/44* (2018.01)
*G06F 9/30* (2018.01)

(52) U.S. Cl.
CPC .......... *G06F 3/0679* (2013.01); *G06F 9/3017* (2013.01); *G06F 9/30032* (2013.01); *G06F 9/30043* (2013.01); *G06F 9/30076* (2013.01); *G06F 9/30083* (2013.01); *G06F 9/30189* (2013.01); *G06F 9/4418* (2013.01); *Y02B 60/1246* (2013.01); *Y02B 60/186* (2013.01); *Y02B 60/32* (2013.01)

(56) References Cited

U.S. PATENT DOCUMENTS

| | | | |
|---|---|---|---|
| 7,725,750 | B2 | 5/2010 | Ashish et al. |
| 7,904,736 | B2 | 3/2011 | You et al. |
| 7,925,853 | B2 | 4/2011 | Gschwind et al. |
| 8,589,854 | B2 | 11/2013 | Ng et al. |
| 8,601,305 | B2 | 12/2013 | Lee |
| 2004/0002823 | A1* | 1/2004 | Aldridge ............... G06F 1/3203 702/60 |
| 2004/0181660 | A1* | 9/2004 | Kato ..................... G06F 1/3203 713/1 |
| 2007/0106914 | A1* | 5/2007 | Muthukumar ........ G06F 1/3203 713/300 |
| 2008/0195876 | A1 | 8/2008 | Priel et al. |
| 2008/0256551 | A1 | 10/2008 | Priel et al. |
| 2008/0307244 | A1 | 12/2008 | Bertelsen et al. |
| 2010/0185833 | A1* | 7/2010 | Saito ..................... G06F 1/3203 712/203 |
| 2011/0127524 | A1 | 6/2011 | Yamazaki et al. |
| 2011/0314314 | A1 | 12/2011 | Sengupta |
| 2012/0166852 | A1 | 6/2012 | Sodhi et al. |
| 2013/0070515 | A1 | 3/2013 | Mayhew et al. |
| 2013/0132753 | A1 | 5/2013 | Priel et al. |
| 2013/0235689 | A1 | 9/2013 | Koyama |
| 2013/0248854 | A1 | 9/2013 | Yamazaki et al. |
| 2013/0261835 | A1 | 10/2013 | Takahashi et al. |
| 2013/0262828 | A1 | 10/2013 | Yoneda |
| 2013/0262896 | A1* | 10/2013 | Yoneda .................. G06F 1/324 713/322 |
| 2013/0315011 | A1 | 11/2013 | Takahashi et al. |
| 2013/0326244 | A1 | 12/2013 | Koyama et al. |
| 2014/0025978 | A1 | 1/2014 | Tokunaga |
| 2014/0068300 | A1 | 3/2014 | Nishijima et al. |

FOREIGN PATENT DOCUMENTS

| | | |
|---|---|---|
| TW | I279133 | 4/2007 |
| TW | 201303720 | 1/2013 |
| TW | 201434041 | 9/2014 |
| TW | I452511 | 9/2014 |

OTHER PUBLICATIONS

Hayashikoshi et al., "Normally-Off MCU Architecture for Low-power Sensor Node," 2014 19th Asia and South Pacific Design Automation Conference (ASP-DAC), Jan. 20-23, 2014, pp. 12-16.

Yu et al., "A Non-Volatile Microcontroller with Integrated Floating-Gate Transistors," 2011 IEEE/IFIP 41st International Conference on Dependable Systems and Networks Workshops (DSN-W), Jun. 27-30, 2011, pp. 75-80.

Sakimura et al., "10.5 A 90nm 20MHz Fully Nonvolatile Microcontroller for Standby-Power—Critical Applications," 2014 IEEE International Solid-State Circuits Conference Digest of Technical Papers (ISSCC), Feb. 9-13, 2014, pp. 184-185.

"IGZO technology may revolutionize LSIs, not only displays: Normally-off CPU just one possibility," EmergingTech from Japan, www.semiconportal.com, Jun. 11, 2012, pp. 1-7.

Zong-Ting Li, "Power Management for Handheld Devices—Use Android for Example," Thesis for Master of Science, Department of Computer Science and Engineering Tatung University, Jan. 2012, pp. 1-42.

Hwang et al., "A Predictive Dynamic Power Management Technique for Embedded Mobile Devices," IEEE Transactions on Consumer Electronics, May 2010, pp. 713-719.

Bambagini, "Power Management in Real-Time Embedded Systems," Master Degree in Computer Engineering University of Pisa, Dec. 2, 2010, pp. 1-102.

Katz and Gentile, "Using system services for real time embedded multimedia applications," Embedded, http://www.embedded.com, Oct. 31, 2005, pp. 1-10.

"Office Action of Taiwan Counterpart Application," dated Aug. 24, 2015, p. 1-p. 5.

"Office Action of China Counterpart Application," dated Feb. 5, 2018, p1-p8, in which the listed reference was cited.

* cited by examiner

CONVERSION METHOD FOR REDUCING POWER CONSUMPTION AND COMPUTING APPARATUS USING THE SAME

TECHNICAL FIELD

The disclosure is related to a conversion method for reducing power consumption and a computing apparatus using the same.

BACKGROUND

In recent years, techniques for designing low-power chips have been continuously developed, which facilitate in reducing power consumption, so as to extend battery lifetime of mobile devices. For instance, a normally-off computing technique is a technique for reducing power consumption. The normally-off computing function can achieve reduction of power consumption by means of power-gating and memory devices including a non-volatile part. However, currently available hardware lacks capability of supporting the normally-off computing function.

SUMMARY

The disclosure introduces a conversion method for reducing power consumption and a computing apparatus using the same to support a normally-off computing function.

According to an embodiment of the disclosure, a computing apparatus is introduced. The computing apparatus includes a conversion unit, a data storage unit and an instruction processing unit. The conversion unit receives a first instruction sequence in which each instruction in the first instruction sequence belongs to an instruction set. In a power saving mode, the conversion unit combines a second instruction sequence having the same function as the first instruction sequence with at least one specific instruction to obtain and output a third instruction sequence. The at least one specific instruction does not belong to the instruction set. The data storage unit includes a volatile part and a non-volatile part. The instruction processing unit is coupled to the conversion unit and the data storage unit, processes the third instruction sequence and manages a storage state of the data storage unit according to the at least one specific instruction.

According to an embodiment of the disclosure, a conversion method for reducing power consumption is introduced. The method includes: receiving a first instruction sequence (in which each instruction in the first instruction sequence belongs to an instruction set) by a conversion unit of a computing apparatus; combining a second instruction sequence having the same function as the first instruction sequence with at least one specific instruction by the conversion unit in a power saving mode to obtain and output a third instruction sequence, where the at least one specific instruction does not belong to the instruction set; processing the third instruction sequence and managing a storage state of a data storage unit of the computing apparatus according to the at least one specific instruction by an instruction processing unit of the computing apparatus, where the data storage unit includes a volatile part and a non-volatile part.

Based on the above, in the conversion method for reducing power consumption and the computing apparatus using the same introduced by the embodiments of the disclosure, the conversion unit is configured. The conversion unit can receive the first instruction sequence in which each instruction in the first instruction sequence belongs to the instruction set. In the power saving mode, the conversion unit can combine the second instruction sequence having the same function as the first instruction sequence with the at least one specific instruction to obtain and output the third instruction sequence. The at least one specific instruction does not belong to the instruction set. The instruction processing unit can manage the storage state of the data storage unit according to the at least one specific instruction. Therefore, the conversion method for reducing power consumption and the computing apparatus thereof introduced by the embodiments of the disclosure can support the normally-off computing function.

Several exemplary embodiments accompanied with figures are described below to further describe the disclosure in detail.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
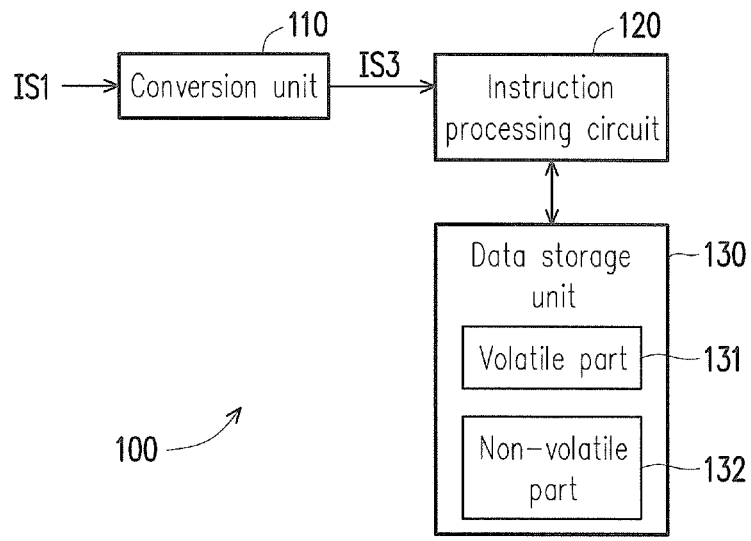
FIG. 1 is a schematic block diagram illustrating a computing apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, whenever appropriate in the drawings and embodiments, elements/components/steps with the same reference numerals represent the same or similar parts. Elements/components/steps with the same reference numerals or names in different embodiments may be cross-referenced.

FIG. 1 is a schematic block diagram illustrating a computing apparatus 100 according to an embodiment of the disclosure. The computing apparatus 100 includes a conversion unit 110, an instruction processing unit 120 and a data storage unit 130. In an embodiment, when the computing apparatus 100 is operated in a normal operation mode, the conversion unit 110 may convert a first instruction sequence IS1 into a second instruction sequence IS2 having the same function as the first instruction sequence IS1 and then output the second instruction sequence IS2 to the instruction processing unit 120 to serve as a third instruction sequence IS3. In some of the embodiments, the second instruction sequence has different instructions from the first instruction sequence IS1, but has the same function as the first instruction sequence IS1. In some other embodiments, the first instruction sequence IS1 is identical to the second instruction sequence. In some of the embodiments, when the computing apparatus 100 is operated in the normal operation mode, the conversion unit 110 may directly output the first instruction sequence IS1 to the instruction processing unit 120 to serve as the third instruction sequence IS3. The data storage unit 130 may store backup data. In some of the embodiments (but the disclosure is not limited thereto), the data storage unit 130 may be a hybrid memory including a volatile part 131 and a non-volatile part 132, a nonvolatile memory or any other memory storing the backup data. For instance, the data storage unit 130 may include a non-volatile static random access memory (NV-SRAM), a non-volatile dynamic random access memory (NV-DRAM) and/or a non-volatile flip-flop (NV-FF).

Figure 2:
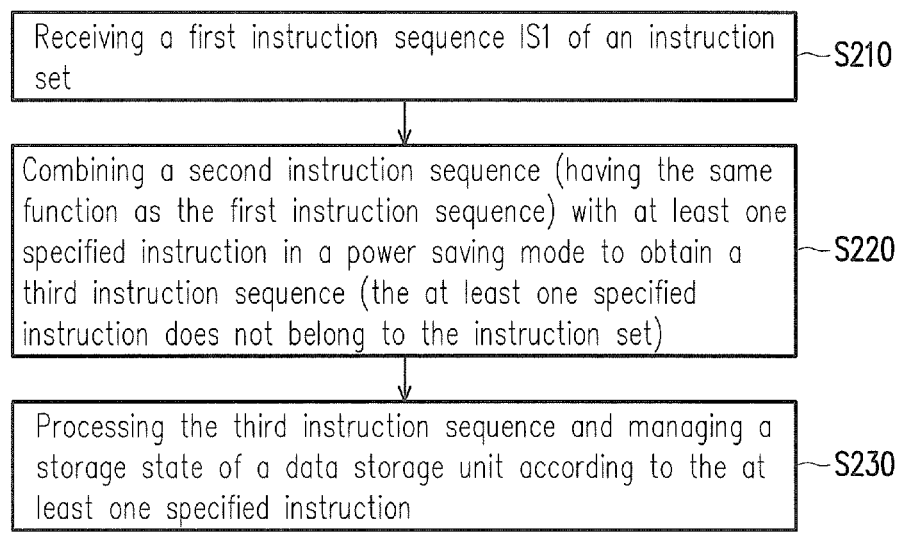
FIG. 2 is a schematic flowchart illustrating a conversion method for reducing power consumption according to an embodiment of the disclosure.

FIG. 2 is a schematic flowchart illustrating a conversion method for reducing power consumption according to an embodiment of the disclosure. Referring to FIG. 1 and FIG. 2, in step S210, the conversion unit 110 receives the first instruction sequence IS1 in which each instruction in the first instruction sequence IS1 belongs to an instruction set.

In some other embodiments, when the computing apparatus 100 is operated in the normal operation mode, the conversion unit 110 may convert the first instruction sequence IS1 into the second instruction sequence having the same function as the first instruction sequence IS1 and then output the second instruction sequence to the instruction processing unit 120 to serve as the third instruction sequence IS3. In some of the embodiments, the second instruction sequence has different instructions from the first instruction sequence IS1, but has the same function as the first instruction sequence IS1. In some other embodiments, the first instruction sequence IS1 is identical to the second instruction sequence. In some of the embodiments, when the computing apparatus 100 is operated in the normal operation mode, the conversion unit 110 may directly output the first instruction sequence IS1 to the instruction processing unit 120 to serve as the third instruction sequence IS3.

In a power saving mode, the conversion unit 110 may combine the second instruction sequence having the same function as the first instruction sequence IS1 with at least one specific instruction to obtain and output the third instruction sequence IS3 (step S220). Each instruction included in the first instruction sequence IS1 belongs to the instruction set while the at least one specific instruction does not.

The instruction processing unit 120 is coupled with the conversion unit 110 and the data storage unit 130. In step S230, the instruction processing unit 120 may process the third instruction sequence IS3 provided by the conversion unit 110 to manage a storage state of the data storage unit 130 according to the at least one specific instruction.

In some of the embodiments (but the disclosure is not limited thereto), the at least one specific instruction includes a data backup instruction and/or a data restore instruction. When executing the data backup instruction included in the third instruction sequence IS3, the instruction processing unit 120 may trigger the data storage unit 130 to store data of the volatile part 131 in the non-volatile part 132 and then power off the volatile part 131 and the non-volatile part 132 after the data of the volatile part 131 is stored in the non-volatile part 132. When executing the data restore instruction included in the third instruction sequence IS3, the instruction processing unit 120 may trigger the data storage unit 130 to power on the volatile part 131 and the non-volatile part 132 and restore the data stored in the non-volatile part 132 to the volatile part 131.

In some other embodiments (but the disclosure is not limited thereto), the at least one specific instruction may include a data backup instruction, a power-off instruction, a power-on instruction and/or a data restore instruction. When executing a data backup instruction included in the third instruction sequence IS3, the instruction processing unit 120 may trigger the data storage unit 130 to store the data of the volatile part 131 in the non-volatile part 132. The data backup instruction may be used to store the data of the volatile part 131 in the non-volatile part 132 to cause change to a storage state of the non-volatile part 132. When executing a power-off instruction included in the third instruction sequence IS3, the instruction processing unit 120 may trigger the data storage unit 130 to power off the volatile part 131 and the non-volatile part 132. The power-off instruction may be used to power off the volatile part 131, such that the data of the volatile part 131 is lost (i.e., the storage state of the volatile part 131 is changed). When executing a power-on instruction included in the third instruction sequence IS3, the instruction processing unit 120 may trigger the data storage unit 130 to re-power on the volatile part 131 and the non-volatile part 132. The power-on instruction may be used to re-power on the volatile part 131, such that the volatile part 131 may store data (e.g., an initial value or an unknown value). When executing a data restore instruction included in the third instruction sequence IS3, the instruction processing unit 120 may trigger the data storage unit 130 to restore the data stored in the non-volatile part 132 to the volatile part 131. The data restore instruction may be used to restore the data of the non-volatile part 132 to the volatile part 131, such that the storage state of the volatile part 131 is changed.

Thus, the instruction processing unit 120 may manage the storage state of the data storage unit 130 according to the at least one specific instruction included in the third instruction sequence IS3. In the conversion method for reducing power consumption and the computing apparatus 100 using the same of the embodiment, the conversion unit 110 is configured to support the normally-off computing function.

Figure 3:
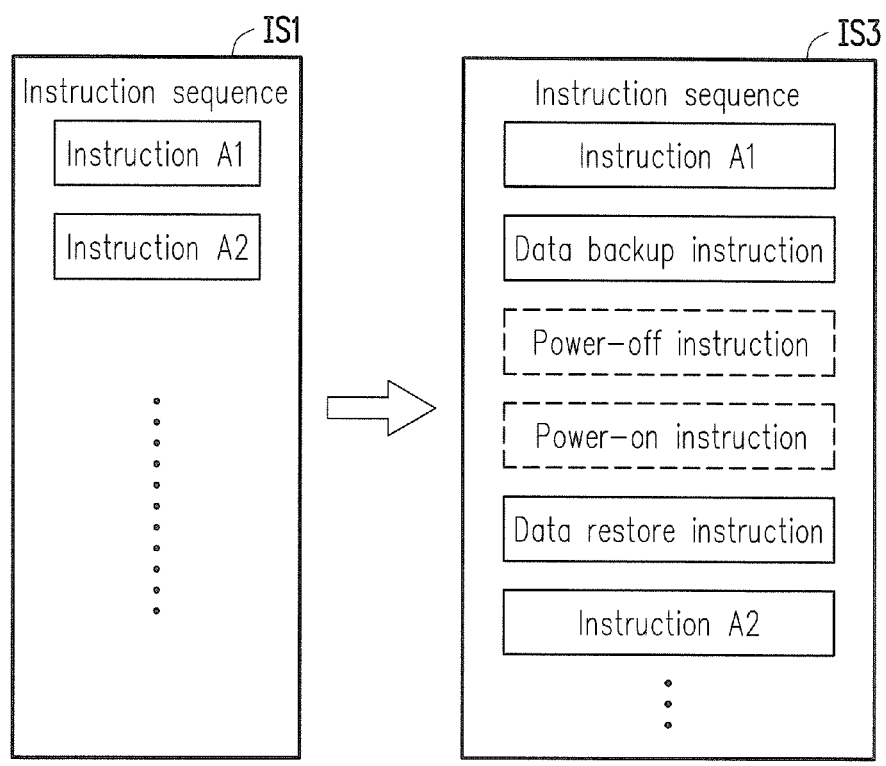
FIG. 3 is a schematic diagram illustrating the instruction sequences depicted in FIG. 1 according to an embodiment of the disclosure.

FIG. 3 is a schematic diagram illustrating the instruction sequences depicted in FIG. 1 according to an embodiment of the disclosure. In this case, it is assumed that the first instruction sequence IS1 is identical to the second instruction sequence. Referring to FIG. 1 and FIG. 3, in a power saving mode, the conversion unit 110 may combine the second instruction sequence (herein, the first instruction sequence IS1) with at least one specific instruction (herein, a data backup instruction, a power-off instruction, a power-on instruction and a data restore instruction, but the disclosure is not limited thereto) to obtain and output the third instruction sequence IS3. In this case, the at least one specific instruction may be inserted between instructions A1 and A2 when the computing apparatus 100 may be operated in the power saving mode after executing the instruction A1. The at least one specific instruction does not belong to an instruction set each instruction included in the first instruction sequence IS1 belongs to. When executing the "data backup instruction" included in the third instruction sequence IS3, the instruction processing unit 120 may trigger the data storage unit 130 to store data of the volatile part 131 in the non-volatile part 132. When executing the "power-off instruction" included in the third instruction sequence IS3, the instruction processing unit 120 may trigger the data storage unit 130 to power off the volatile part 131 and the non-volatile part 132. When executing the "power-on instruction" included in the third instruction sequence IS3, the instruction processing unit 120 may trigger the data storage unit 130 to re-power on the volatile part 131 and the non-volatile part 132. When executing the "data restore instruction" included in the third instruction sequence IS3, the instruction processing unit 120 may trigger the data storage unit 130 to restore the data stored in the non-volatile part 132 to the volatile part 131.

In some other embodiments, the power-off instruction and the power-on instruction depicted in FIG. 3 may be omitted. When executing the "data backup instruction" included in the third instruction sequence IS3, the instruction processing unit 120 may trigger the data storage unit 130 to store the data of the volatile part 131 in the non-volatile part 132 and power off the volatile part 131 and the non-volatile part 132 after the data of the volatile part 131 is stored in the non-volatile part 132. When executing the "data restore instruction" included in the third instruction sequence IS3, the instruction processing unit 120 may trigger the data storage unit 130 to re-power on the volatile part 131 and the non-volatile part 132 and restore the data stored in the non-volatile part 132 to the volatile part 131.

Figure 4:
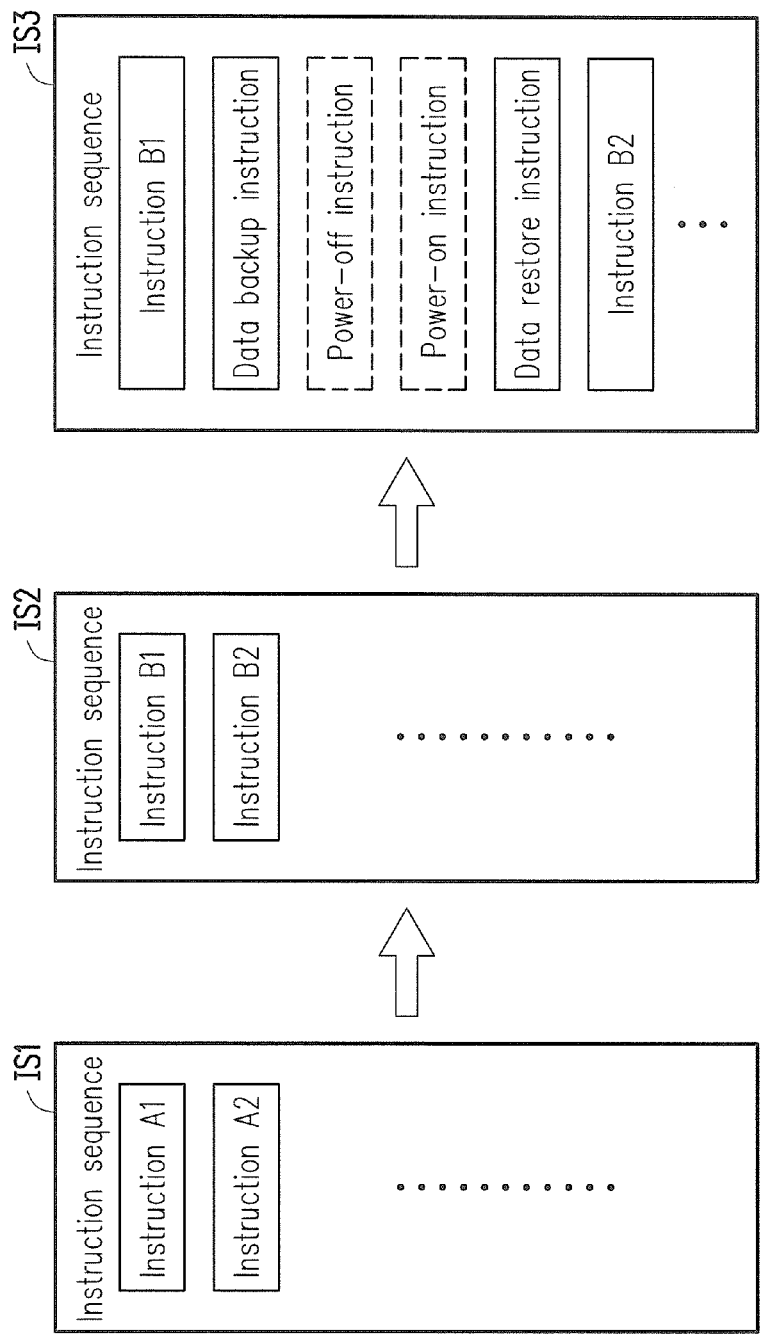
FIG. 4 is a schematic diagram illustrating the instruction sequences depicted in FIG. 1 according to another embodiment of the disclosure.

FIG. 4 is a schematic diagram illustrating the instruction sequences depicted in FIG. 1 according to another embodiment of the disclosure. Referring to FIG. 1 and FIG. 4, in a power saving mode, the conversion unit 110 may convert the first instruction sequence IS1 to a second instruction sequence IS2 having the same function as the first instruction sequence IS1 and then, combine the second instruction sequence IS2 with at least one specific instruction (herein, a data backup instruction, a power-off instruction, a power-on instruction and a data restore instruction, but the disclosure is not limited thereto) to obtain and output the third instruction sequence IS3. In the embodiment, the at least one specific instruction may be inserted between instructions B1 and B2 when the computing apparatus 100 may be operated in the power saving mode after executing the instruction B1. The data backup instruction, the power-off instruction, the power-on instruction and the data restore instruction illustrated in FIG. 4 may be derived from the descriptions related to the embodiment illustrated in FIG. 3 and will not be repeatedly described.

Figure 5:
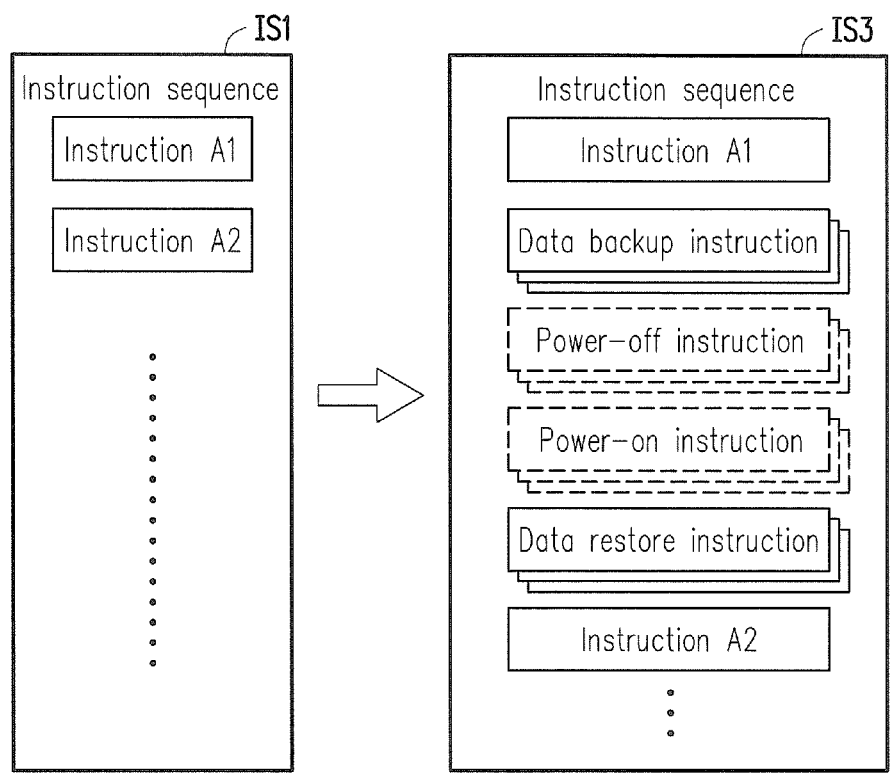
FIG. 5 is a schematic diagram illustrating the instruction sequences depicted in FIG. 1 according to yet another embodiment of the disclosure.

FIG. 5 is a schematic diagram illustrating the instruction sequences depicted in FIG. 1 according to yet another embodiment of the disclosure. Referring to FIG. 1 and FIG. 5, it is assumed in this case that the conversion unit 110 directly serves the first instruction sequence IS1 as the second instruction sequence. In a power saving mode, the conversion unit 110 may combine the second instruction sequence (which is the first instruction sequence IS1 herein) and at least one specific instruction to obtain and output the third instruction sequence IS3. In the embodiment, the at least one specific instruction may be inserted between instructions A1 and A2 when the computing apparatus 100 may be operated in the power saving mode after executing the instruction A1. In the embodiment, the data storage unit 130 may include a plurality of memory circuit groups which are coupled to the instruction processing unit 120. In the embodiment, the at least one specific instruction includes a plurality of memory-group instructions. For instance, the memory-group instructions may include a plurality of "data backup" instructions, a plurality of "power-off" instructions, a plurality of "power-on" instructions and a plurality of "data restore" instructions respectively corresponding to different memory circuit groups, but the disclosure is not limited thereto. The instruction processing unit 120 may manage states of the memory circuit groups in the data storage unit 130 respectively according to the memory-group instructions included in the third instruction sequence IS3. The data backup instructions, the power-off instructions, the power-on instructions and the data restore instructions illustrated in FIG. 5 may be derived from the descriptions related to the embodiment illustrated in FIG. 3 and will not be repeatedly described.

In some other embodiments, the memory-group instructions illustrated in FIG. 5 (which include the plurality of data backup instructions, the plurality of power-off instructions, the plurality of power-on instructions and the plurality of data restore instructions, but the disclosure is not limited thereto) may be combined into the second instruction sequence IS2 illustrated in FIG. 4, so as to obtain the third instruction sequence IS3.

Figure 6:
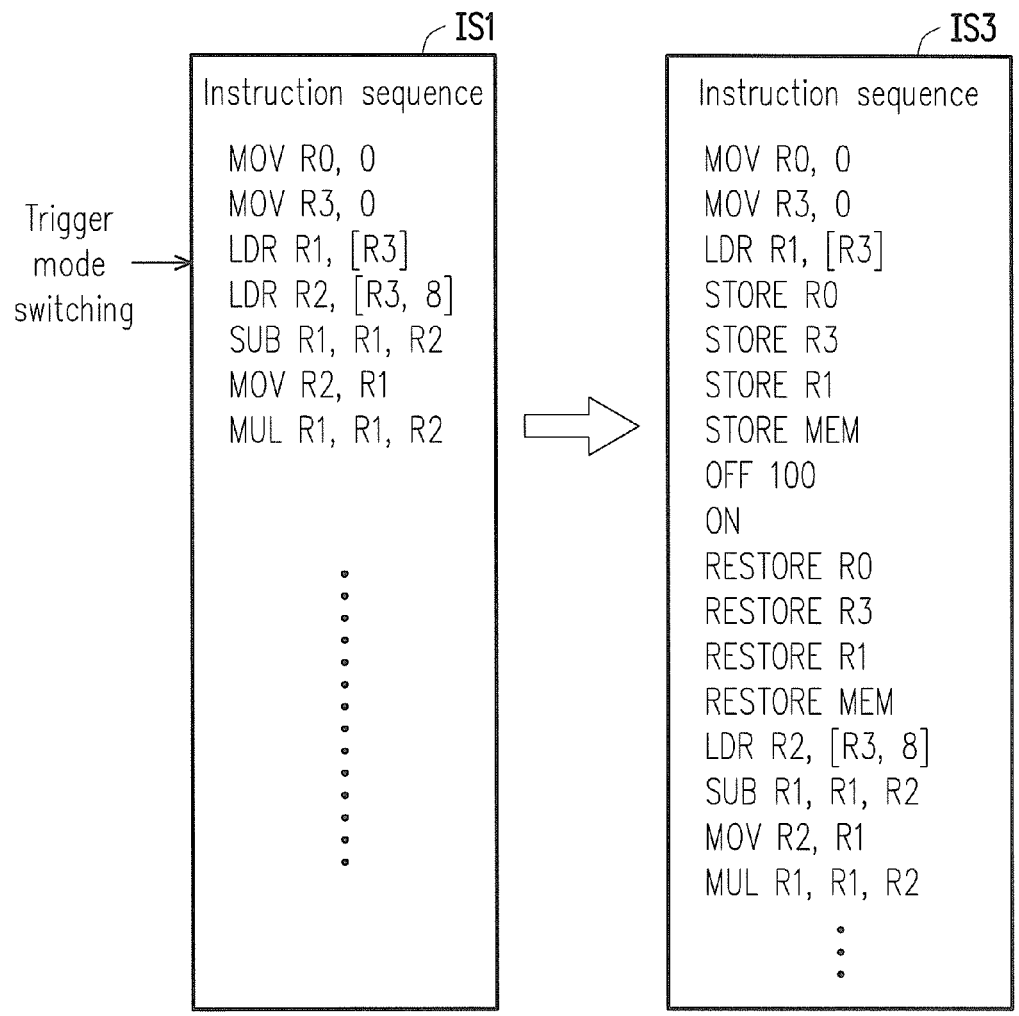
FIG. 6 is a schematic diagram illustrating the instruction sequences depicted in FIG. 1 according to still another embodiment of the disclosure.

FIG. 6 is a schematic diagram illustrating the instruction sequences depicted in FIG. 1 according to still another embodiment of the disclosure. Referring to FIG. 1 and FIG. 6, it is assumed in this case that the conversion unit 110 directly serves the first instruction sequence IS1 as the second instruction sequence. In a power saving mode, the conversion unit 110 may combine the second instruction sequence (which is the first instruction sequence IS1 herein) and at least one specific instruction (which includes data backup instructions, power-off instructions, power-on instructions and data restore instructions, but the disclosure is not limited thereto) to obtain and output the third instruction sequence IS3. In the embodiment, the data storage unit 130 may include a plurality of memory circuit groups, and the conversion unit 110 may also combine the corresponding specific instructions into the second instruction sequence (which is the first instruction sequence IS1 herein) according to usage states of the memory circuit groups. For instance, it is assumed that the computing apparatus 100 has 16 memory circuit groups (R1-R16) used as registers and two memory circuit groups (MEM and MEM1) used as two non-overlapped memory access regions. If a system power mode the computing apparatus 100 is operated in is changed from a normal operation mode to a power saving mode after executing the third instruction "LDR R1 , [R3]" in the second instruction sequence (which is the first instruction sequence IS1 herein) and at the same time the memory circuit groups R2, R4-R15 and MEM1 (the memory access region which is not overlapped with that (MEM) used by the instruction "LDR R1, [R3]") of the data storage unit 130 have not been used yet, data of the unused memory circuit groups R2, R4-R15 and MEM1 do not have to be backed up. In the case, the memory circuit groups R0, R1, R3 and MEM of the data storage unit 130 are used. Thus, in the power saving mode, the conversion unit 110 may combine the data backup instructions (e.g., "STORE R0", "STORE R3", "STORE R1" and "STORE MEM" shown in FIG. 6), the power-off instruction (e.g., "OFF 100" shown in FIG. 6), the power-on instruction (e.g., "ON" shown in FIG. 6) and the data restore instructions (e.g., "RESTORE R0", "RESTORE R3", "RESTORE R1" and "RESTORE MEM" shown in FIG. 6) into the second instruction sequence (which is the first instruction sequence IS1 herein) to obtain and output the third instruction sequence IS3. In the embodiment, the power-off instruction "OFF 100" may indicate that the period of powering off the memory circuit groups of the data storage unit 130 is 100 ms.

The data backup instructions (i.e., "STORE R0", "STORE R3", "STORE R1" and "STORE MEM"), the power-off instruction (i.e., "OFF 100"), the power-on instruction (i.e., "ON") and the data restore instructions (i.e., "RESTORE R0", "RESTORE R3", "RESTORE R1" and "RESTORE MEM") shown in FIG. 6 may be derived from the descriptions related to the data backup instruction(s), the power-off instruction(s), the power-on instruction(s) and the data restore instruction(s) shown in FIG. 3 or FIG. 5 and will not be repeatedly described. In some other embodiments, the embodiment illustrated in FIG. 6 may be applied to the embodiment illustrated in FIG. 4.

Figure 7:
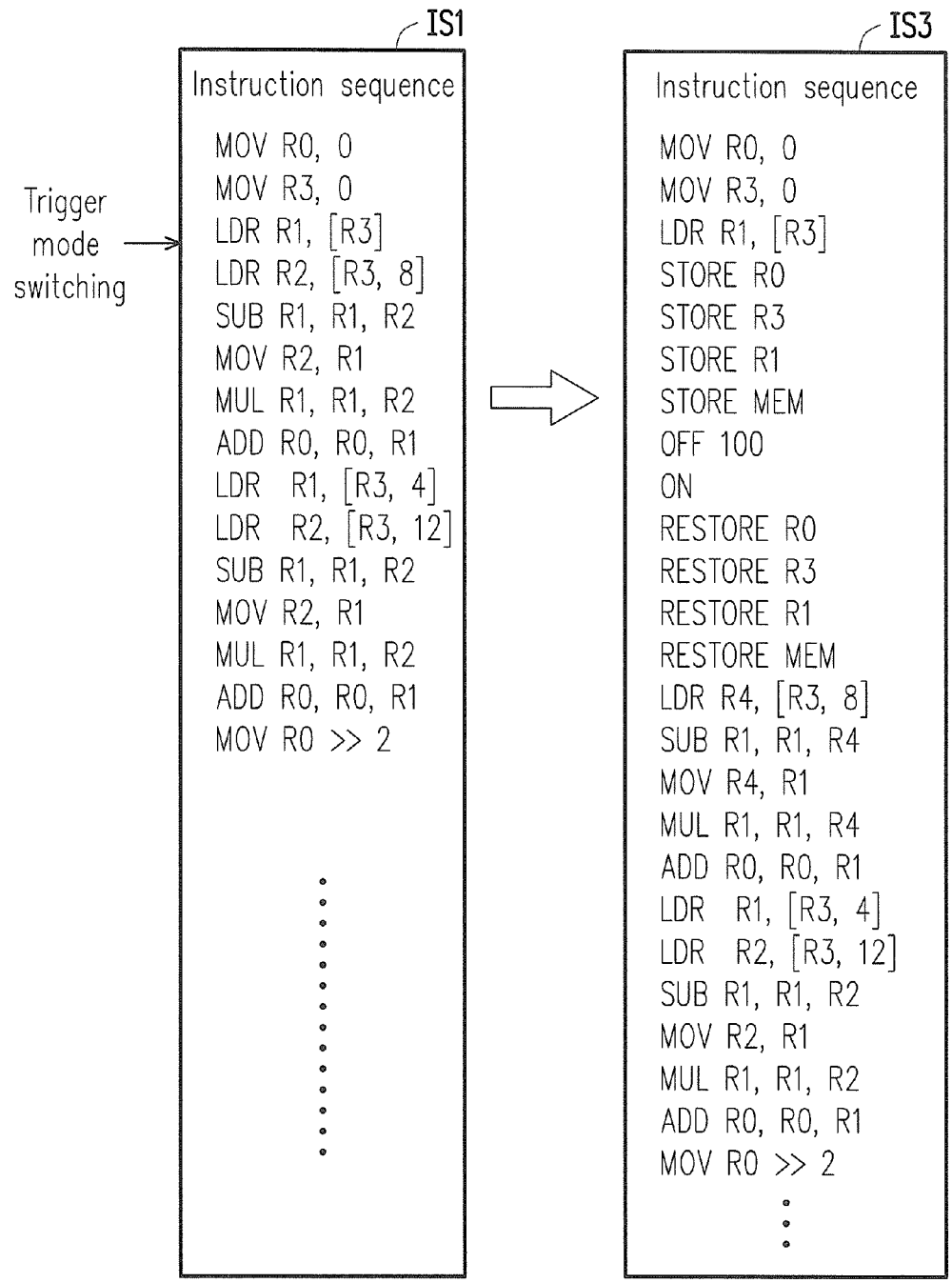
FIG. 7 is a schematic diagram illustrating the instruction sequences depicted in FIG. 1 according to further another embodiment of the disclosure.

FIG. 7 is a schematic diagram illustrating the instruction sequences depicted in FIG. 1 according to further another embodiment of the disclosure. Referring to FIG. 1 and FIG. 7, in a power saving mode, the conversion unit 110 may convert the first instruction sequence IS1 to the second instruction sequence having the same function as the first instruction sequence IS1. For instance, the conversion unit 110 may convert instructions "LDR R2, [R3, 8]", "SUB R1, R1, R2", "MOV R2, R1" and "MUL R1, R1, R2" included in the first instruction sequence IS1 to instructions "LDR R4, [R3, 8]", "SUB R1, R1, R4", "MOV R4, R1" and "MUL R1, R1, R4" included in the second instruction sequence. Then, the conversion unit 110 may combine the second instruction sequence with at least one specific instruction (which includes data backup instructions, power-off instructions, power-on instructions and data restore instructions, but the disclosure is not limited thereto) to obtain and output the third instruction sequence IS3. The embodiment of converting the first instruction sequence IS1 having the same function as the second instruction sequence illustrated in FIG. 7 may be derived from the descriptions related to the embodiment illustrated in FIG. 4 and will not be repeatedly described.

In the embodiment, the data storage unit 130 may include a plurality of memory circuit groups, and the conversion unit 110 may also combine the corresponding specific instructions into the second instruction sequence according to usage states of the memory circuit groups. For instance, it is assumed that the computing apparatus 100 has 16 memory circuit groups (R1-R16) used as registers and two memory circuit groups (MEM and MEM1) used as two non-overlapped memory access regions. If a system power mode in which the computing apparatus 100 is operated is changed from a normal operation mode to the power saving mode after executing the third instruction "LDR R1, [R3]" in the second instruction sequence (which is the first instruction sequence IS1 herein) and at the same time the memory circuit groups R2, R4-R15 and MEM1 (the memory access region which is not overlapped with that (MEM) used by the instruction "LDR R1, [R3]") of the data storage unit 130 have not been used yet, data of the unused memory circuit groups R2, R4-R15 and MEM1 do not have to be backed up. In the case, the memory circuit groups R0, R1, R3 and MEM of the data storage unit 130 are used. Thus, in the power saving mode, the conversion unit 110 may combine the data backup instructions (e.g., "STORE R0", "STORE R3", "STORE R1" and "STORE MEM" shown in FIG. 7, the power-off instruction (e.g., "OFF 100" shown in FIG. 7), the power-on instruction (e.g., "ON" shown in FIG. 7) and the data restore instructions (e.g., "RESTORE R0", "RESTORE R3", "RESTORE R1" and "RESTORE MEM" shown in FIG. 7) to the second instruction sequence to obtain and output the third instruction sequence IS3 shown in FIG. 7. The data backup instructions (i.e., "STORE R0", "STORE R3", "STORE R1" and "STORE MEM"), the power-off instruction (i.e., "OFF 100"), the power-on instruction (i.e., "ON") and the data restore instructions (i.e., "RESTORE R0", "RESTORE R3", "RESTORE R1" and "RESTORE MEM") shown in FIG. 7 may be derived from the descriptions related to the data backup instruction(s), the power-off instruction(s), the power-on instruction(s) and the data restore instruction(s) shown in FIG. 3, FIG. 5 or FIG. 6 and will not be repeatedly described.

Figure 8:
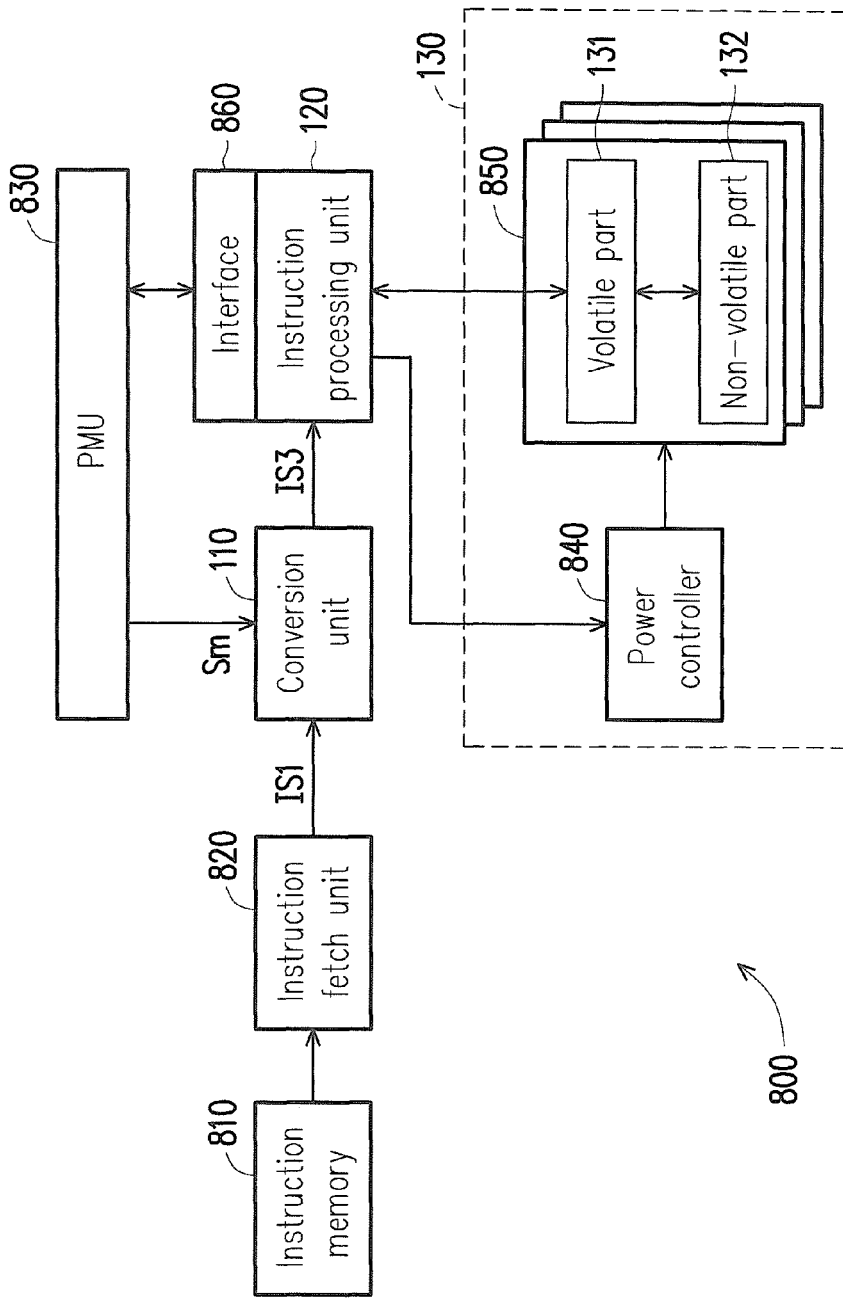
FIG. 8 is a schematic block diagram illustrating a computing apparatus according to another embodiment of the disclosure.

FIG. 8 is a schematic block diagram illustrating a computing apparatus 800 according to another embodiment of the disclosure. The computing apparatus 800 includes an instruction memory 810, an instruction fetch unit 820, a power management unit (PMU) 830, an interface 860, a conversion unit 110, an instruction processing unit 120 and a data storage unit 130. It is assumed that there is a system having the computing apparatus 800. The conversion unit 110, the instruction processing unit 120 and the data storage unit 130 illustrated in FIG. 8 may be derived from the descriptions related to those illustrated in FIG. 1 and FIG. 2. In the embodiment illustrated in FIG. 8, the instruction processing unit 120 may include an instruction decoding unit and/or an instruction execution unit.

In the embodiment illustrated in FIG. 8, the instruction memory 810 may store instruction sequences of a program. The instruction fetch unit 820 is coupled to the instruction memory 810 to fetch instructions and outputs a first instruction sequence IS1 to the conversion unit 110. When the computing apparatus 800 is operated in a normal operation mode, the conversion unit 110 may directly output the first instruction sequence IS1 to the instruction processing unit 120 to serve as a third instruction sequence IS3. In some other embodiments, when the computing apparatus 800 is operated in the normal operation mode, the conversion unit 110 may convert/decode the first instruction sequence IS1 to a second instruction sequence having the same function as the first instruction sequence IS1, then serve the second instruction sequence as the third instruction sequence IS3 and output the third instruction sequence IS3 to the instruction processing unit 120. In a power saving mode, the conversion unit 110 may combine the second instruction sequence with at least one specific instruction to obtain and output the third instruction sequence IS3. The at least one specific instruction does not belong to an instruction set each instruction included in the first instruction sequence IS1 belongs to. Details with respect to the operation of "combining the second instruction sequence with the at least one specific instruction to obtain the third instruction sequence IS3" may be derived from the descriptions related to the embodiments illustrated in FIG. 3 through FIG. 7 and will not be repeatedly described.

The instruction processing unit 120 is coupled to the conversion unit 110 and the data storage unit 130. The instruction processing unit 120 may process the third instruction sequence IS3 provided by the conversion unit 110 and manage a storage state of the data storage unit 130 according to the at least one specific instruction. In the embodiment illustrated in FIG. 8, the data storage unit 130 includes a power controller 840 and one or more memory circuits 850. The power controller 840 is coupled to the instruction processing unit 120 and the memory circuits 850 and controlled by a power control signal of the instruction processing unit 120, so as to power off or re-power on the at least one memory circuit 850.

Each of the memory circuits 850 includes a non-volatile static random access memory (NV-SRAM), a non-volatile dynamic random access memory (NV-DRAM), a non-volatile flip-flop (NV-FF) and/or any other non-volatile storage device or circuit. In some of the embodiments, each of the memory circuits 850 may be a chip. In some other embodiments, each of the memory circuits 850 may be embedded in a chip having the instruction processing unit 120 or in a chip having the computing apparatus 800. The memory circuits 850 are coupled to the instruction processing unit 120. The memory circuits 850 are controlled by the instruction processing unit 120, so as to store data of a volatile part 131 of each memory circuit 850 to a non-volatile part 132 of the corresponding memory circuit 850 or restore data of the non-volatile part 132 to the volatile part 131.

A PMU 830 is coupled to the conversion unit 110. The PMU 830 is coupled to the instruction processing unit 120 through the interface 860. When an operating system (OS) is running on the computing apparatus 800 of the system, the instruction processing unit 120 executes a corresponding instruction sequence for operating the OS. When an interrupt event occurs, the OS may preserve a state of a process that is interrupted by the interrupt event, and then, an interrupt service routine (ISR) that serving the interrupt event trigger that the PMU 830 outputs a mode switching signal Sm with a value to the conversion unit 110. The value indicates that the power mode of the computing apparatus is switched from the normal operation mode to the power saving mode. After receiving the mode switching signal Sm with the value, the conversion unit 110 may insert the at least one specific instruction to the second instruction sequence, so as to obtain the third instruction sequence IS3.

In some of the embodiments, when receiving the mode switching signal Sm with the value, the conversion unit 110 may set a mode switching flag in the conversion unit 110 based on the value of the mode switching signal Sm. If the mode switching flag in the conversion unit 110 is set, the conversion unit 110 may insert the at least one specific instruction into the second instruction sequence to obtain the third instruction sequence IS3.

OS power management may facilitate in changing a power management policy, such as that the system's power mode is switched from an active mode (the normal operation mode) to a low power mode (i.e., the power saving mode). When the power management policy is changed by the OS power management, the OS may configure the PMU 830 through the interface 860, so as to generate the mode switching signal Sm with the value to the conversion unit 110. When receiving the mode switching signal Sm with the value, the mode switching flag of the conversion unit 110 may be set to indicate that the system is currently in the power saving mode. If the mode switching flag of the conversion unit 110 is set, the conversion unit 110 may convert the first instruction sequence IS1 to the third instruction sequence IS3. The third instruction sequence IS3 may include instructions (i.e., the at least one specific instruction, such as data backup instructions, power-off instructions, power-on instructions and/or data restore instructions) used for normally-off computing to manage the storage state of the data storage unit 130. When executing a data backup instruction included in the third instruction sequence IS3, the instruction processing unit 120 may output a first trigger signal to one of the memory circuits 850. The first trigger signal with a value "$DATA_{13}$ BACKUP" may trigger the memory circuit 850 to perform a store operation in which data of the volatile part 131 of the memory circuit 850 is stored in the non-volatile part 132 of the memory circuit 850. According to different implementation requirements, the instruction processing unit 120 may output different first trigger signals to the different memory circuits 850, such that the store operation may be performed on the different memory circuits 850 independently.

When executing a power-off instruction included in the third instruction sequence IS3, the instruction processing unit 120 may output a power control signal with a value "POWER_OFF" to the power controller 840. The value "POWER_OFF" may enable the power controller 840 to perform a power-off operation on the memory circuit 850. According to different implementation requirements, the instruction processing unit 120 may output the different power control signals to the power controller 840, such that the different memory circuits 850 may be powered off independently. The power-off period of each memory circuit 850 may be a constant value or determined through software or hardware. For example, a power supply control signal of a hardware module may be output to the conversion unit 110. After receiving the power supply control signal, the conversion unit 110 may output a power-on instruction to the instruction processing unit 120. The instruction processing unit 120 may then execute the power-on instruction.

When executing the power-on instruction of the third instruction sequence IS3, the instruction processing unit 120 may output the power control signal with a value "POWER_ON" to the power controller 840, and the power controller 840 may re-power on the memory circuit 850 according to the power control signal with the value "POWER_ON". According to different implementation requirements, the instruction processing unit 120 may output the different power control signals to the power controller 840, such that the different memory circuits 850 may be re-powered on independently.

When executing a data restore instruction included in the third instruction sequence IS3, the instruction processing unit 120 may output a second trigger signal to one of the memory circuits 850. The second trigger signal with a value "DATA_ RESTORE" may trigger the memory circuit 850 to perform a restore operation which indicates restoring the data of the non-volatile part 132 of the memory circuit 850 to the volatile part 131 of the memory circuit 850. According to different implementation requirements, the instruction processing unit 120 may output the different second trigger signals to the different memory circuits 850, such that the restore operation is performed on the different memory circuits 850 independently. According to the aforementioned embodiments, the computing apparatus 800 can implement/support the normally-off computing function.

Figure 9:
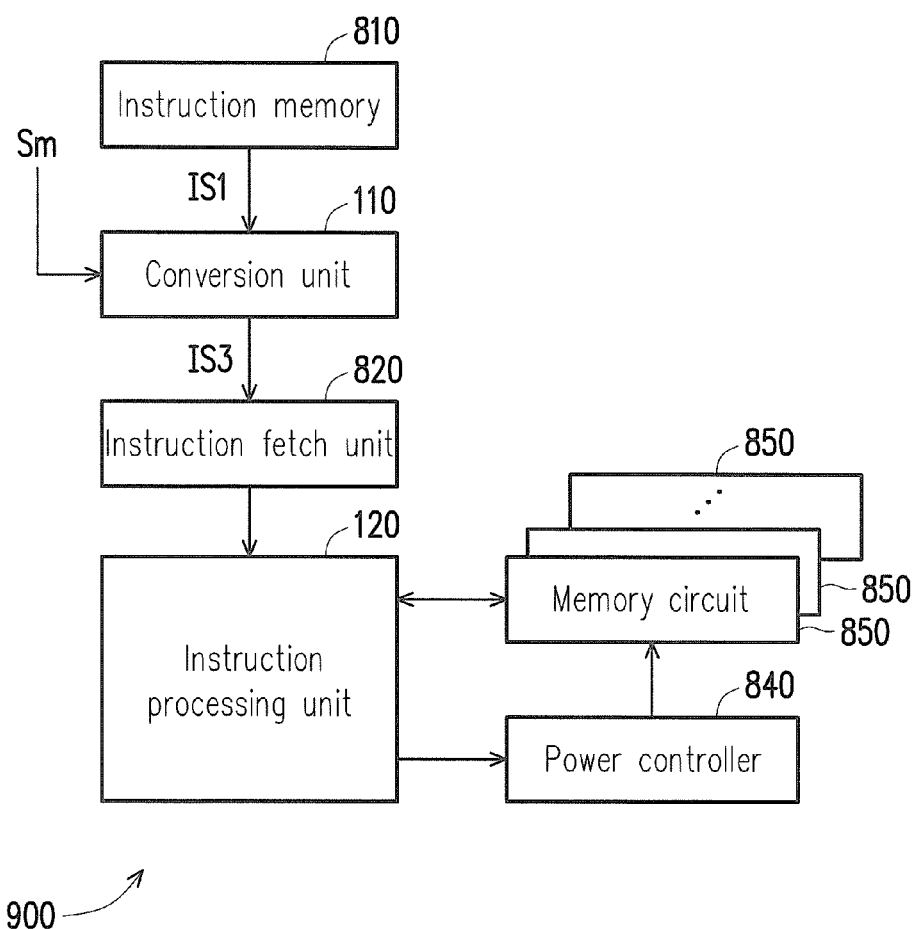
FIG. 9 is a schematic block diagram illustrating a computing apparatus according to yet another embodiment of the disclosure.

FIG. 9 is a schematic block diagram illustrating a computing apparatus 900 according to yet another embodiment of the disclosure. The computing apparatus 900 includes an instruction memory 810, an instruction fetch unit 820, a conversion unit 110, an instruction processing unit 120, a power controller 840 and memory circuits 850. The embodiment illustrated in FIG. 9 may be derived from the descriptions related to the embodiment illustrated in FIG. 8. In the embodiment illustrated in FIG. 9, the conversion unit 110 is coupled between the instruction memory 810 and the instruction fetch unit 820. The conversion unit 110 may fetch a first instruction sequence IS1 from the instruction memory 810 and convert the first instruction sequence IS1 to a third instruction sequence IS3. Details with respect to the operation of the conversion unit 110 illustrated in FIG. 9 may be derived from the descriptions related to the embodiments illustrated in FIG. 1 through FIG. 8 and will not be repeatedly described.

The instruction fetch unit 820 may fetch instructions from the third instruction sequence IS3 and/or decode the instructions included in the third instruction sequence IS3. The instruction fetch unit 820 may output the instructions to the instruction processing unit 120. An instruction sequence may comprise the instructions. The instruction processing unit 120 may manage storage states of the memory circuits 850 according to at least one specific instruction included in the instruction sequence output by the instruction fetch unit 820.

Figure 10:
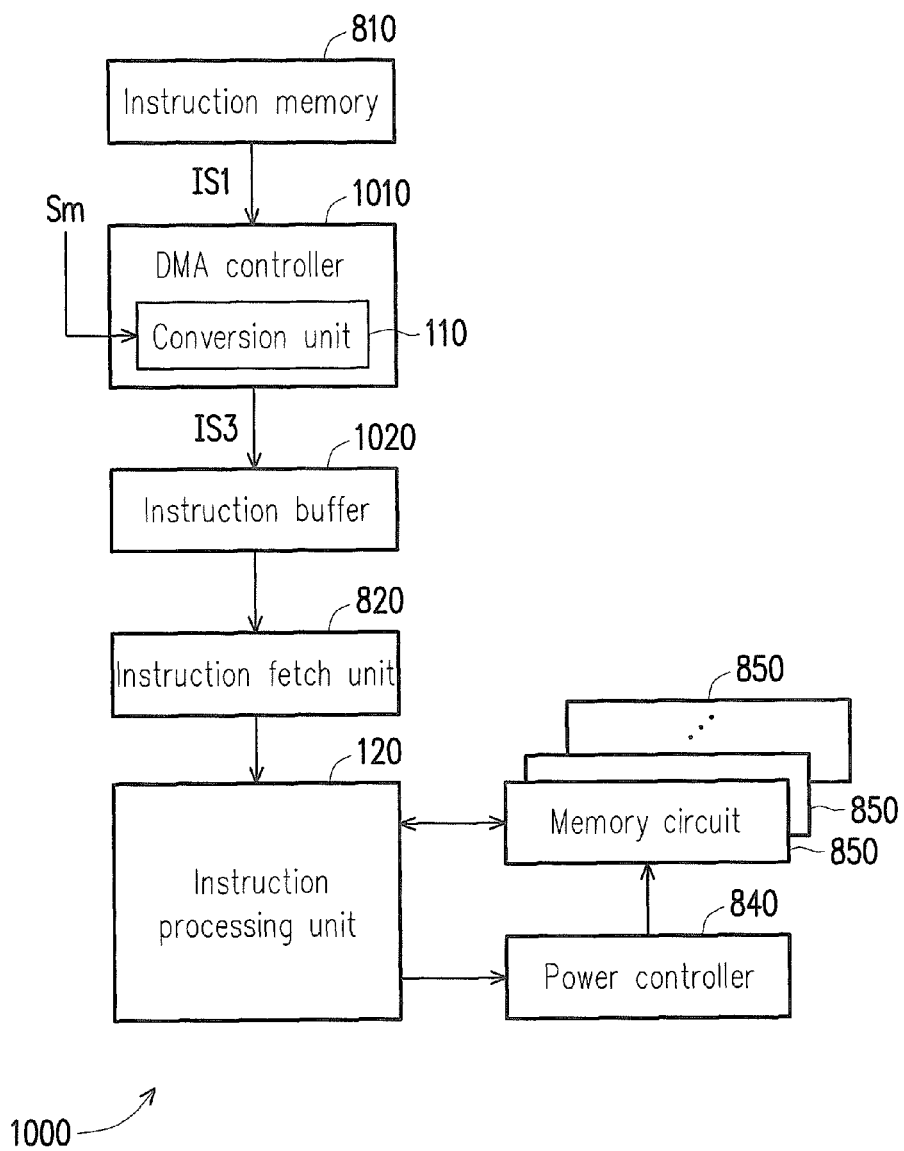
FIG. 10 is a schematic block diagram illustrating a computing apparatus according to further another embodiment of the disclosure.

FIG. 10 is a schematic block diagram illustrating a computing apparatus 1000 according to further another embodiment of the disclosure. The computing apparatus 1000 includes an instruction memory 810, a conversion unit 110, a direct memory access (DMA) controller 1010, an instruction buffer 1020, an instruction fetch unit 820, an instruction processing unit 120, a power controller 840 and memory circuits 850. The embodiment illustrated in FIG. 10 may be derived from the descriptions related to the embodiments illustrated in FIG. 1 through FIG. 9. In the embodiment illustrated in FIG. 10, the conversion unit 110 is embedded in the DMA controller 1010. The DMA controller 1010 may fetch a first instruction sequence IS1 from the instruction memory 810 and provide the first instruction sequence IS1 to the conversion unit 110. The conversion unit 110 may convert the first instruction sequence IS1 to a third instruction sequence IS3 and output the third instruction sequence IS3 to the instruction buffer 1020. Details with respect to the operation of the conversion unit 110 illustrated in FIG. 10 may be derived from the descriptions related to the embodiments illustrated in FIG. 1 through FIG. 9 and will not be repeatedly described.

The instruction fetch unit 820 may fetch the third instruction sequence IS3 from the instruction buffer 1020 and/or decode instructions included in the third instruction sequence IS3. The instruction fetch unit 820 may output the instructions to the instruction processing unit 120. An instruction sequence may comprise the instructions. The instruction processing unit 120 may manage storage states of the memory circuits 850 according to at least one specific instruction included in the instruction sequence output by the instruction fetch unit 820.

Figure 11:
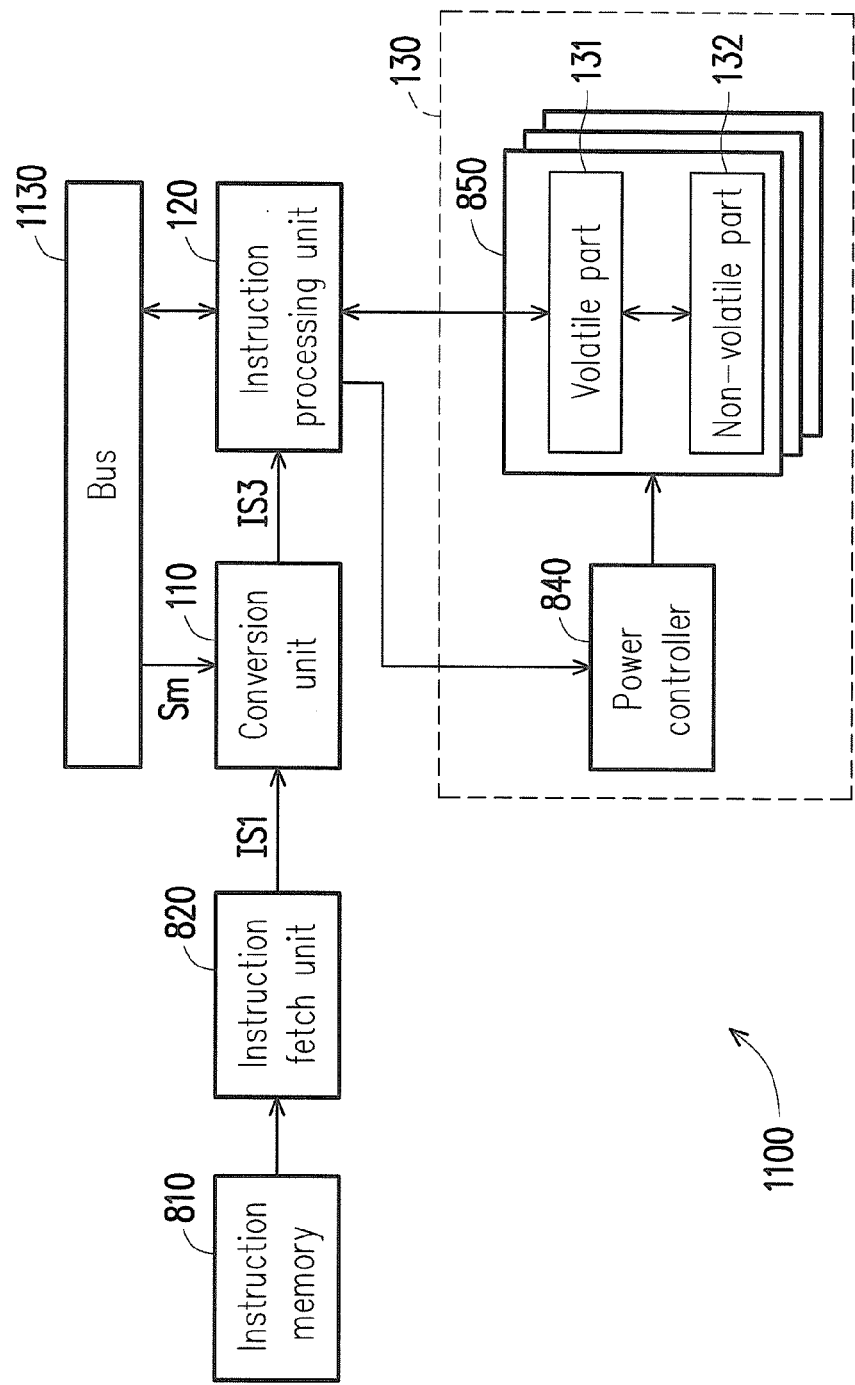
FIG. 11 is a schematic block diagram illustrating a computing apparatus according to another embodiment of the disclosure.

FIG. 11 is a schematic block diagram illustrating a computing apparatus 1100 according to another embodiment of the disclosure. The computing apparatus 1100 includes an instruction memory 810, an instruction fetch unit 820, a bus 1130, a conversion unit 110, an instruction processing unit 120 and a data storage unit 130. It is assumed that there is a system having the computing apparatus 1100. The conversion unit 110, the instruction processing unit 120 and the data storage unit 130 illustrated in FIG. 11 may be derived from the descriptions related to the embodiments illustrated in FIG. 1 through FIG. 10 and will not be repeatedly described. The computing apparatus 1100, the instruction memory 810, the instruction fetch unit 820, the power controller 840 and the memory circuits 850 illustrated in FIG. 11 may be derived from the descriptions related to the computing apparatus 800, the instruction memory 810, the instruction fetch unit 820, the power controller 840 and the memory circuits 850 illustrated in FIG. 8 and will not be repeatedly described.

The bus 1130 is coupled to the conversion unit 110 and the instruction processing unit 120. The conversion unit 110 has a mode switching flag. When a power management process of an OS determines to perform a switching operation which switches the system's power mode from a normal operation mode to a power saving mode, the instruction processing unit 120 may execute a corresponding instruction sequence for mode switching and control the conversion unit 110 to set the mode switching flag in the conversion unit 110 through the bus 1130. After the mode switching flag is set, the conversion unit 110 may insert at least one specific instruction into a second instruction sequence having the same function as the first instruction sequence IS1 to obtain the third instruction sequence IS3. Details with respect to the operation of "inserting the at least one specific instruction into the second instruction sequence to obtain the third instruction sequence IS3" may be derived from the descriptions related to the embodiments illustrated in FIG. 3 through FIG. 7 and will not be repeatedly described.

The OS runs on the computing apparatus 1100 of the system, the instruction processing unit 120 executes a plurality of instruction sequences for operating the OS. When the power management policy is changed by the OS power management (e.g., by switching the system's power mode from the normal operation mode to the power saving mode), a mode switching signal Sm with a value is used to set the mode switching flag of the conversion unit 110 by the instruction processing unit 120 through the bus 1130. The value indicates that the system's power mode is switched from the normal operation mode to the power saving mode. After the mode switching flag of the conversion unit 110 is set, the conversion unit 110 may convert the first instruction sequence IS1 into the third instruction sequence IS3. The third instruction sequence IS3 may include at least one instruction used for normally-off computing (i.e., the at least one specific instruction, such as data backup instructions, power-off instructions, power-on instructions and/or data restore instructions) to manage a storage state of the data storage unit 130.

When a second power management process of the OS determines to perform a second switching operation which switches the system's power mode from the power saving mode to the normal operation mode, the instruction processing unit 120 may execute a corresponding instruction sequence for mode switching and control the conversion unit 110 to unset the mode switching flag in the conversion unit 110 through the bus 1130. After the mode switching flag is unset, the conversion unit 110 may convert the first instruction sequence IS1 into the second instruction sequence having the same function as the first instruction sequence IS1 and then output the second instruction sequence to the instruction processing unit 120 to serve as the third instruction sequence IS3.

Figure 12:
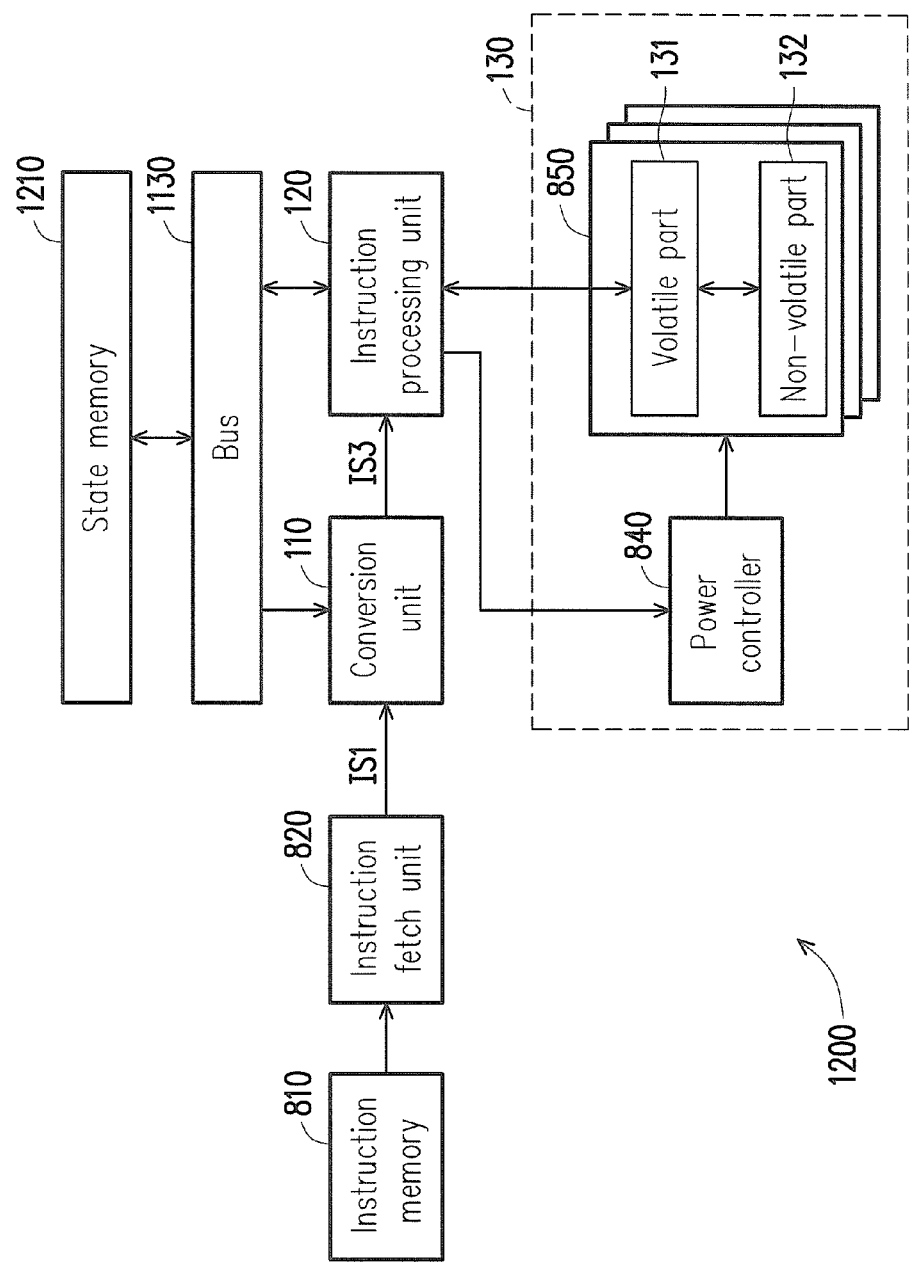
FIG. 12 is a schematic block diagram illustrating a computing apparatus according to further another embodiment of the disclosure.

FIG. 12 is a schematic block diagram illustrating a computing apparatus 1200 according to further another embodiment of the disclosure. The computing apparatus 1200 includes an instruction memory 810, an instruction fetch unit 820, a bus 1130, a state memory 1210, a conversion unit 110, an instruction processing unit 120 and a data storage unit 130. It is assumed that there is a system having the computing apparatus 1200. The conversion unit 110, the instruction processing unit 120 and the data storage unit 130 illustrated in FIG. 12 may be derived from the descriptions related to the embodiments illustrated in FIG. 1 through FIG. 11 and will not repeatedly described. The computing apparatus 1200, the instruction memory 810, the instruction fetch unit 820, the bus 1130, the power controller 840 and the memory circuits 850 may be derived from the descriptions related to the computing apparatus 1100, the instruction memory 810, the instruction fetch unit 820, the bus 1130, the power controller 840 and the memory circuits 850 illustrated in FIG. 11 and will not be repeatedly described.

The state memory 1210 has a mode switching flag. The bus 1130 is coupled to the state memory 1210, the conversion unit 110 and the instruction processing unit 120. When a power management process of an OS determines to perform a switching operation which switches the system's power mode from a normal operation mode to a power saving mode, the instruction processing unit 120 may execute a corresponding instruction sequence for mode switching and set the mode switching flag in the state memory 1210 through the bus 1130. The conversion unit 110 may regularly or irregularly check the mode switching flag in the state memory 1210 through the bus 1130. According to the mode switching flag, the conversion unit 110 may insert at least one specific instruction into a second instruction sequence having the same function as the first instruction sequence IS1 to obtain the third instruction sequence IS3. Details with respect to the operation of "inserting the at least one specific instruction into the second instruction sequence to obtain the third instruction sequence IS3" may be derived from the descriptions related to the embodiments illustrated in FIG. 3 through FIG. 7 and will not be repeatedly described.

When a second power management process of the OS determines to perform a second switching operation which switches the system's power mode from the power saving mode to the normal operation mode, the instruction processing unit 120 may execute a corresponding instruction sequence for mode switching and unset the mode switching flag in the state memory 1210 through the bus 1130. The conversion unit 110 may regularly or irregularly check the mode switching flag in the state memory 1210 through the bus 1130. After the mode switching flag in the state memory 1210 is unset and read by the conversion unit 110, the conversion unit 110 may convert the first instruction sequence IS1 into the second instruction sequence having the same function as the first instruction sequence IS1 and then output the second instruction sequence to the instruction processing unit 120 to serve as the third instruction sequence IS3.

Figure 13:
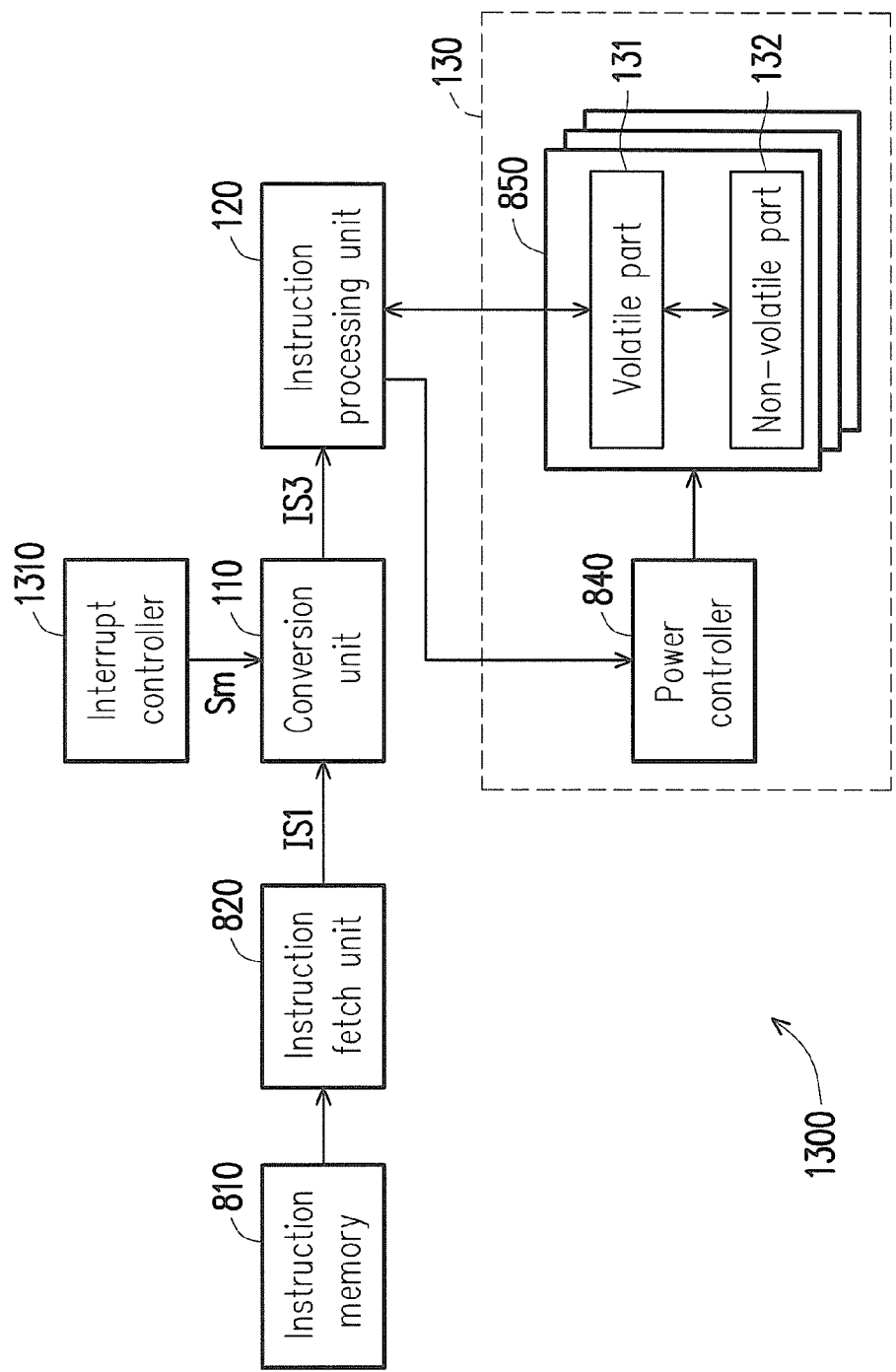
FIG. 13 is a schematic block diagram illustrating a computing apparatus according to further another embodiment of the disclosure.

FIG. 13 is a schematic block diagram illustrating a computing apparatus 1300 according to further another embodiment of the disclosure. The computing apparatus 1300 includes an instruction memory 810, an instruction fetch unit 820, an interrupt controller 1310, a conversion unit 110, an instruction processing unit 120 and a data storage unit 130. It is assumed that there is a system having the computing apparatus 1300. The conversion unit 110, the instruction processing unit 120 and the data storage unit 130 illustrated in FIG. 13 may be derived from the descriptions related to the embodiments illustrated in FIG. 1 through FIG. 12 and will not repeatedly described. The computing apparatus 1300, the instruction memory 810, the instruction fetch unit 820, the power controller 840 and the memory circuits 850 may be derived from the descriptions related to the computing apparatus 800, the instruction memory 810, the instruction fetch unit 820, the power controller 840 and the memory circuits 850 illustrated in FIG. 8 and will not be repeatedly described.

The interrupt controller 1310 is coupled to the conversion unit 110 and may detect whether a hardware interrupt which indicates the system's power mode is changed from a normal operation mode to a power saving mode occurs. For instance, the interrupt controller 1310 may detect the hardware interrupt by monitoring a value of an interrupt signal output from a hardware module inside or outside the system. If the system's power mode is changed from the normal operation mode to the power saving mode, the hardware module may output the interrupt signal (indicating that the hardware interrupt occurs) to the interrupt controller 1310. When the hardware interrupt occurs, the interrupt controller 130 outputs the mode switching signal Sm to the conversion unit 110. After the conversion unit 110 receives the mode switching signal Sm with a value indicating the system's power mode is changed from the normal operation mode to the power saving mode, the mode switching flag of the conversion unit 110 may be set to indicate that the system is currently in the power saving mode. After the mode switching flag of the conversion unit 110 is set, the conversion unit 110 may insert at least one specific instruction into a second instruction sequence having the same function as the first instruction sequence IS1 to obtain the third instruction sequence IS3. Details with respect to the operation of "inserting the at least one specific instruction into the second instruction sequence to obtain the third instruction sequence IS3" may be derived from the descriptions related to the embodiments illustrated in FIG. 3 through FIG. 7 and will not be repeatedly described.

The interrupt controller 1310 is coupled to the conversion unit 110 and may detect whether a second hardware interrupt which indicates the system's power mode is changed from the power saving mode to the normal operation mode occurs. For instance, the interrupt controller 1310 may detect the second hardware interrupt by monitoring a value of a second interrupt signal output from the hardware module inside or outside the system. If the system's power mode is changed from the power saving mode to the normal operation mode, the hardware module may output the second interrupt signal (indicating that the second hardware interrupt occurs) to the interrupt controller 1310. When the second hardware interrupt occurs, the interrupt controller 130 outputs the mode switching signal Sm to the conversion unit 110. After the conversion unit 110 receives the mode switching signal Sm with a second value indicating the system's power mode is changed from the power saving mode to the normal operation mode, the mode switching flag of the conversion unit 110 may be unset to indicate that the system is currently in the normal operation mode. After the mode switching flag of the conversion unit 110 is unset, the conversion unit 110 may convert the first instruction sequence IS1 into the second instruction sequence having the same function as the first instruction sequence IS1 and then output the second instruction sequence to the instruction processing unit 120 to serve as the third instruction sequence IS3.

Figure 14:
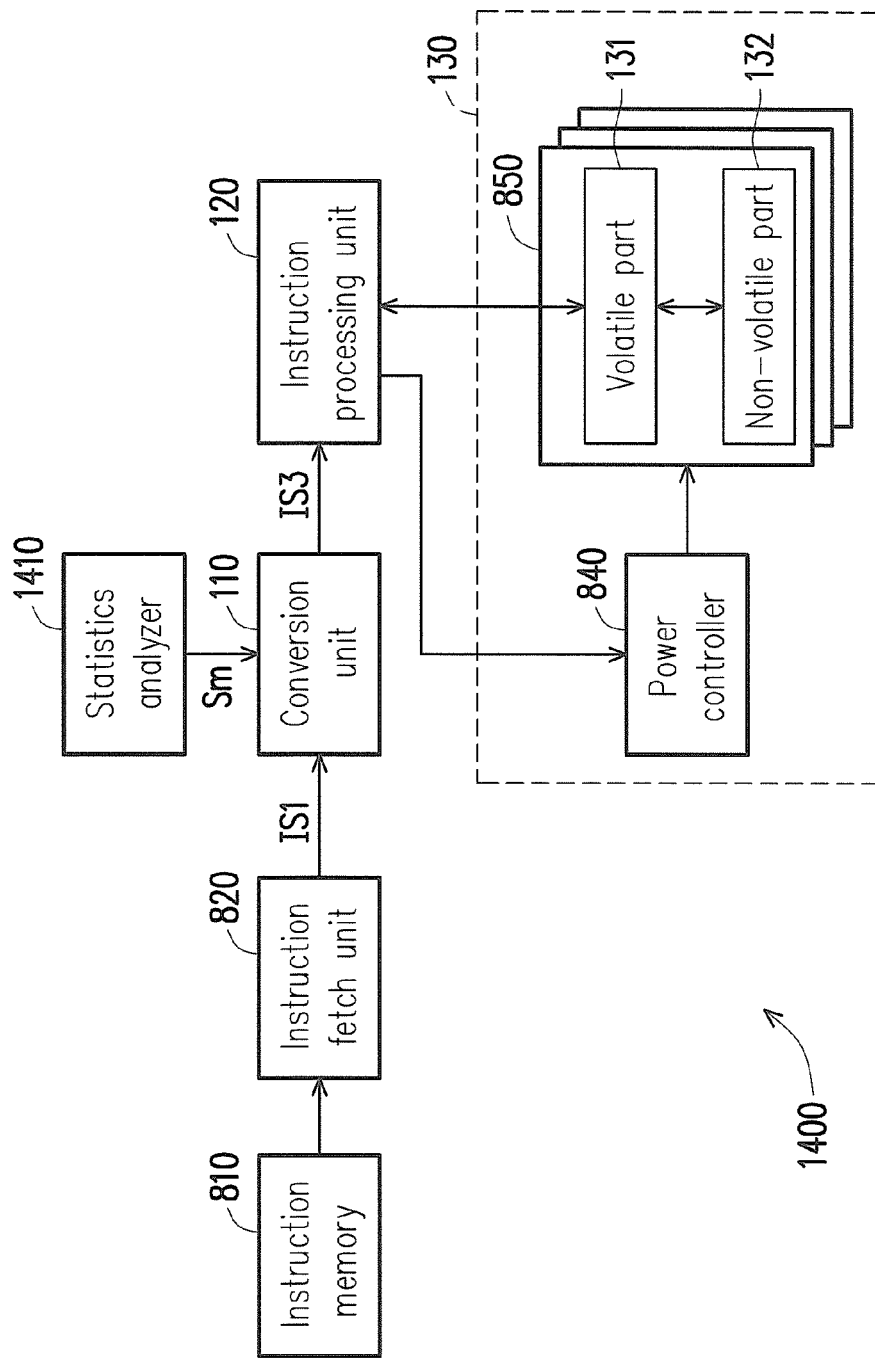
FIG. 14 is a schematic block diagram illustrating a computing apparatus according to further another embodiment of the disclosure.

FIG. 14 is a schematic block diagram illustrating a computing apparatus 1400 according to further another embodiment of the disclosure. The computing apparatus 1400 includes an instruction memory 810, an instruction fetch unit 820, a statistics analyzer 1410, a conversion unit 110, an instruction processing unit 120 and a data storage unit 130. It is assumed that there is a system having the computing apparatus 1400. The conversion unit 110, the instruction processing unit 120 and the data storage unit 130 illustrated in FIG. 14 may be derived from the descriptions related to the embodiments illustrated in FIG. 1 through FIG. 13 and will not repeatedly described. The computing apparatus 1400, the instruction memory 810, the instruction fetch unit 820, the power controller 840 and the memory circuits 850 illustrated in FIG. 14 may be derived from the descriptions related to the computing apparatus 800, the instruction memory 810, the instruction fetch unit 820, the power controller 840 and the memory circuits 850 illustrated in FIG. 8 and will not repeatedly described.

The statistics analyzer 1410 is coupled to a hardware module of the system (e.g., the instruction fetch unit 820, the instruction processing unit 120 and/or any other hardware module of the system) to collect statistical information related to the hardware module of the system and analyze an operation state of the hardware module of the system. According to the operation state of the hardware module of the system, the statistics analyzer 1410 may determine whether it outputs a mode switching signal Sm with a value to the conversion unit 110. The value indicates that the system's power mode is switched from a normal operation mode to a power saving mode. For instance, the statistics analyzer 1410 may collect state statistical information, e.g., information of instructions per cycle (IPC), information of misses per kilo instructions (MPKI) or any other statistical information from a hardware state unit (not shown). According to the collected state statistical information, the statistics analyzer 1410 may determine whether it outputs the mode switching signal Sm with the value indicating the system's power mode is changed from the normal operation mode to the power saving mode to the conversion unit 110.

After the conversion unit 110 receives the mode switching signal Sm with the value indicating the system's power mode is changed from the normal operation mode to the power saving mode, a mode switching flag of the conversion unit 110 may be set to indicate that the system is currently in the power saving mode. After the mode switching flag of the conversion unit 110 is set, the conversion unit 110 may insert at least one specific instruction into a second instruction sequence having the same function as the first instruction sequence IS1 to obtain the third instruction sequence IS3. Details with respect to the operation of "inserting the at least one specific instruction into the second instruction sequence to obtain the third instruction sequence IS3" may be derived from the descriptions related to the embodiments illustrated in FIG. 3 through FIG. 7 and will not be repeatedly described. According to the operation state of the hardware module of the system, the statistics analyzer 1410 may determine whether it outputs the mode switching signal Sm with a second value to the conversion unit 110. The second value indicates that the system's power mode is switched from the power saving mode to the normal operation mode. According to the collected state statistical information, the statistics analyzer 1410 may determine whether it outputs the mode switching signal Sm with the second value to the conversion unit 110.

After the conversion unit 110 receives the mode switching signal Sm with the second value, the mode switching flag of the conversion unit 110 may be unset to indicate that the system is currently in the normal operation mode. After the mode switching flag of the conversion unit 110 is unset, the conversion unit 110 may convert the first instruction sequence IS1 into the second instruction sequence having the same function as the first instruction sequence IS1 and then output the second instruction sequence to the instruction processing unit 120 to serve as the third instruction sequence IS3.

Figure 15:
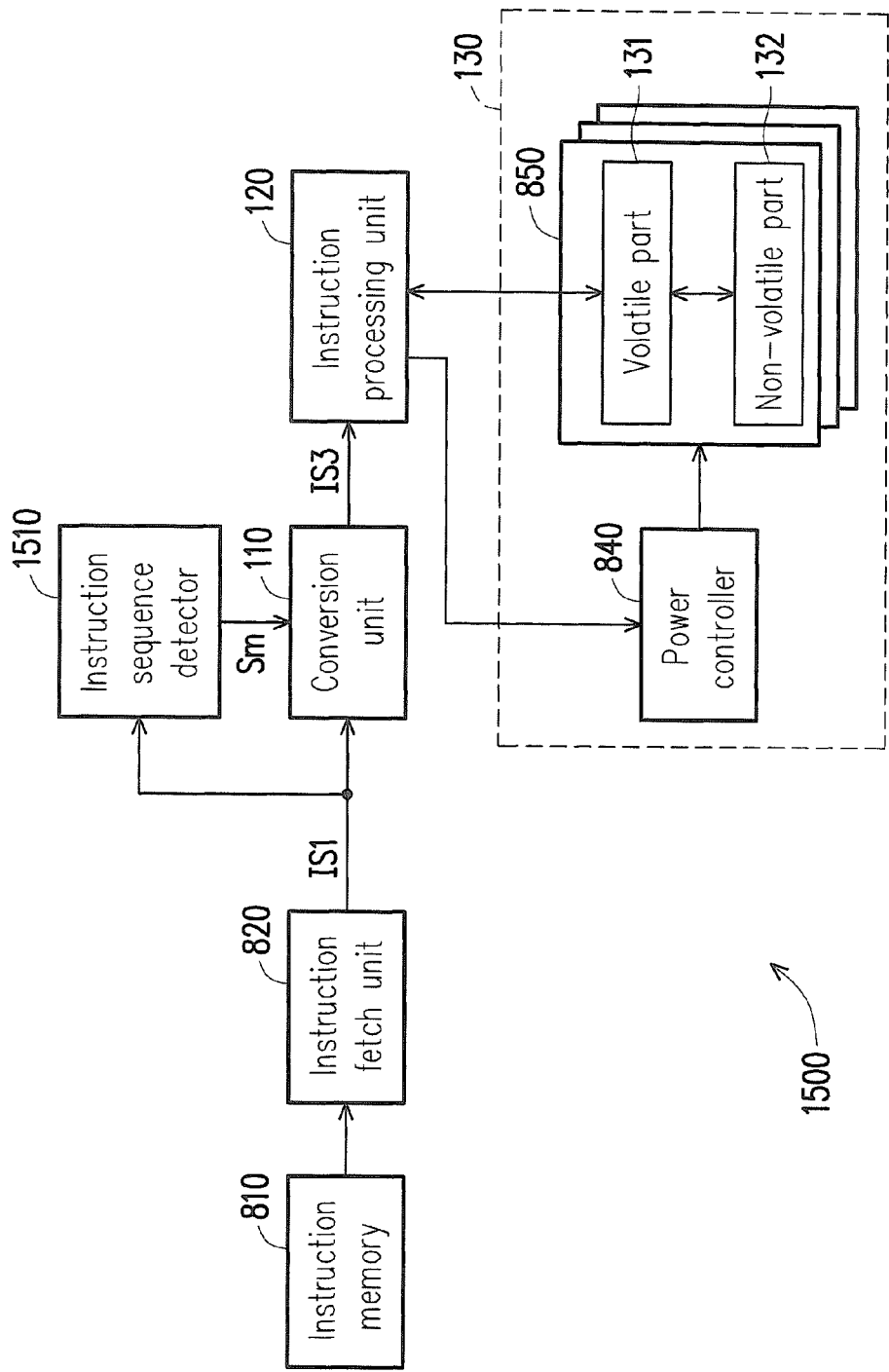
FIG. 15 is a schematic block diagram illustrating a computing apparatus according to further another embodiment of the disclosure.

FIG. 15 is a schematic block diagram illustrating a computing apparatus 1500 according to further another embodiment of the disclosure. The computing apparatus 1500 includes an instruction memory 810, an instruction fetch unit 820, an instruction sequence detector 1510, a conversion unit 110, an instruction processing unit 120 and a data storage unit 130. It is assumed that there is a system having the computing apparatus 1500. The conversion unit 110, the instruction processing unit 120 and the data storage unit 130 illustrated in FIG. 15 may be derived from the descriptions related to the embodiments illustrated in FIG. 1 through FIG. 14 and will not repeatedly described. The computing apparatus 1500, the instruction memory 810, the instruction fetch unit 820, the power controller 840 and the memory circuits 850 illustrated in FIG. 15 may be derived from the descriptions related to the computing apparatus 800, the instruction memory 810, the instruction fetch unit 820, the power controller 840 and the memory circuits 850 illustrated in FIG. 8 and will not repeatedly described.

The instruction sequence detector 1510 is coupled to the conversion unit 110 and may be used to detect a predetermined mode switching pattern indicating that the system's power mode is switched from a normal operation mode to a power saving mode. When the instruction sequence detector 1510 detects the predetermined mode switching pattern from a first instruction sequence IS1, the instruction sequence detector 1510 may output a mode switching signal Sm with a value to the conversion unit 110. The value indicates that the system's power mode is switched from the normal operation mode to the power saving mode. For instance, current power management policy may be changed by the OS power management, e.g., switching the system's power mode from the normal operation mode to the power saving mode. When the current power management policy is changed by the OS power management, a power management task may be scheduled by the OS and the predetermined mode switching pattern including instructions may be fetched by the instruction fetch unit 820 and executed by the instruction processing unit 120. When the instruction sequence detector 1510 detects the predetermined mode switching pattern from the first instruction sequence IS1, the instruction sequence detector 1510 may output the mode switching signal Sm with the value to the conversion unit 110.

When the conversion unit 110 receives the mode switching signal Sm with the value, a mode switching flag of the conversion unit 110 may be set to indicate that the system is currently in the power saving mode. After the mode switching flag of the conversion unit 110 is set, the conversion unit 110 may insert at least one specific instruction into a second instruction sequence having the same function as the first instruction sequence IS1 to obtain the third instruction sequence IS3. Details with respect to the operation of "inserting the at least one specific instruction into the second instruction sequence to obtain the third instruction sequence IS3" may be derived from the descriptions related to the embodiments illustrated in FIG. 3 through FIG. 7 and will not be repeatedly described.

The instruction sequence detector 1510 may be used to detect a second predetermined mode switching pattern indicating that the system's power mode is switched from the power saving mode to the normal operation mode. When the instruction sequence detector 1510 detects the second predetermined mode switching pattern from the first instruction sequence IS1, the instruction sequence detector 1510 may output the mode switching signal Sm with a second value to the conversion unit 110. The second value indicates that the system's power mode is switched from the power saving mode to the normal operation mode. For instance, current power management policy may be changed by the OS power management, e.g., switching the system's power mode from the power saving mode to the normal operation mode. When the current power management policy is changed by the OS power management, a power management task may be scheduled by the OS and the second predetermined mode switching pattern including instructions may be fetched by the instruction fetch unit 820 and executed by the instruction processing unit 120. When the instruction sequence detector 1510 detects the second predetermined mode switching pattern from the first instruction sequence IS1, the instruction sequence detector 1510 may output the mode switching signal Sm with the second value to the conversion unit 110.

When the conversion unit 110 receives the mode switching signal Sm with the second value, the mode switching flag of the conversion unit 110 may be unset to indicate that the system is currently in the normal operation mode. After the mode switching flag of the conversion unit 110 is unset, the conversion unit 110 may convert the first instruction sequence IS1 into the second instruction sequence having the same function as the first instruction sequence IS1 and then output the second instruction sequence to the instruction processing unit 120 to serve as the third instruction sequence IS3.

To conclude, in the conversion method for reducing power consumption and the computing apparatus using the same introduced by the embodiments of the disclosure, the conversion unit is configured. The conversion unit can receive the first instruction sequence and convert the first instruction sequence to the third instruction sequence in the power saving mode. For instance, the conversion unit can combine the second instruction sequence having the same function as the first instruction sequence with the at least one specific instruction to obtain and output the third instruction sequence. The at least one specific instruction does not belong to the instruction set each instruction included in the first instruction sequence belongs to. The instruction processing unit can manage the storage state of the data storage unit according to the at least one specific instruction. Therefore, the conversion method for reducing power consumption and the computing apparatus thereof introduced by the embodiments of the disclosure can support the normally-off computing function.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A computing apparatus, comprising:
   a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;
   a data storage unit, comprising a volatile part and a non-volatile part;
   an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction;
   a power management unit (PMU), coupled to the conversion circuit and the instruction processing circuit,
   wherein the instruction processing circuit executes a corresponding instruction sequence for operating an operating system (OS), and the OS preserves a state of a process that is interrupted by an interrupt event, an interrupt service routine that serving the interrupt event triggers the PMU to output a mode switching signal with a value indicating that the computing apparatus is in the power saving mode to the conversion circuit, and
   wherein the conversion circuit inserts the at least one specific instruction into the second instruction sequence to obtain the third instruction sequence, after receiving the mode switching signal with the value indicating that the computing apparatus is in the power saving mode.

2. The computing apparatus according to claim 1, wherein the first instruction sequence is identical to the second instruction sequence.

3. The computing apparatus according to claim 1, wherein in a normal operation mode, the conversion circuit outputs the first instruction sequence to the instruction processing circuit to serve as the third instruction sequence.

4. The computing apparatus according to claim 1, wherein the at least one specific instruction comprises a data backup instruction and a data restore instruction,
   when executing the data backup instruction of the third instruction sequence, the instruction processing circuit triggers the data storage unit to store data of the volatile part into the non-volatile part and powers off the volatile part and the non-volatile part after storing the data of the volatile part into the non-volatile part, and
   when executing the data restore instruction of the third instruction sequence, the instruction processing circuit triggers the data storage unit to re-power on the volatile part and the non-volatile part and restores the data stored in the non-volatile part to the volatile part.

5. The computing apparatus according to claim 1, wherein the at least one specific instruction comprises a data backup instruction, a power-off instruction, a power-on instruction and a data restore instruction, when executing the data backup instruction of the third instruction sequence, the instruction processing circuit triggers the data storage unit to store data of the volatile part into the non-volatile part, when executing the power-off instruction of the third instruction sequence, the instruction processing circuit triggers the data storage unit to power off the volatile part and the non-volatile part, when executing the power-on instruction of the third instruction sequence, the instruction processing circuit triggers the data storage unit to re-power on the volatile part and the non-volatile part, and when executing the data restore instruction of the third instruction sequence, the instruction processing circuit triggers the data storage unit to restore the data stored in the non-volatile part to the volatile part.

6. The computing apparatus according to claim 1, wherein the data storage unit comprises:

a memory circuit, coupled to the instruction processing circuit, and controlled by the instruction processing circuit to store data of the volatile part of the memory circuit into the non-volatile part of the memory circuit or to restore the data stored in the non-volatile part to the volatile part; and a power controller, coupled to the instruction processing circuit and the memory circuit, and controlled by the instruction processing circuit to power off the memory circuit or to re-power on the memory circuit.

7. The computing apparatus according to claim 6, wherein the memory circuit comprises a non-volatile static random access memory, a non-volatile dynamic random access memory or a non-volatile flip-flop.

8. The computing apparatus according to claim 1, wherein the data storage unit comprises a non-volatile static random access memory, a non-volatile dynamic random access memory, or a non-volatile flip-flop.

9. The computing apparatus according to claim 1, wherein the at least one specific instruction comprises a plurality of memory-group instructions, and the data storage unit comprises:

a plurality of memory circuit groups, coupled to the instruction processing circuit, wherein the instruction processing circuit manages storage states of the memory circuit groups respectively according to the plurality of memory-group instructions.

10. A conversion method for reducing power consumption, comprising:

receiving a first instruction sequence in which each instruction in the first instruction sequence belongs to an instruction set by a conversion unit of a computing apparatus;

combining, in a power saving mode, a second instruction sequence having the same function as the first instruction sequence with at least one specific instruction used for supporting normally-off computing function to reduce power consumption by the conversion unit to obtain and output a third instruction sequence, wherein the at least one specific instruction does not belong to the instruction se;

processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;

executing a corresponding instruction sequence for operating an operating system by the instruction processing unit;

preserving a state of a process that is interrupted by an interrupt event;

triggering a power management unit to output a mode switching signal with a value indicating that the computing apparatus is in the power saving mode to the conversion unit by an interrupt service routine that serving the interrupt event; and inserting the at least one specific instruction into the second instruction sequence to obtain the third instruction sequence by the conversion unit, after receiving the mode switching signal with the value.

11. The conversion method according to claim 10, wherein the first instruction sequence is identical to the second instruction sequence.

12. The conversion method according to claim 10, further comprising:

outputting, by the conversion unit, the first instruction sequence to the instruction processing unit to serve as the third instruction sequence in a normal operation mode.

13. The conversion method according to claim 10, wherein the at least one specific instruction comprises a data backup instruction and a data restore instruction, the conversion method further comprising:

when the instruction processing unit executes the data backup instruction of the third instruction sequence, triggering the data storage unit by the instruction processing unit to store data of the volatile part into the non-volatile part and after the data of the volatile part is stored into the non-volatile part, powering off the volatile part and the non-volatile part; and when the instruction processing unit executes the data restore instruction of the third instruction sequence, triggering the data storage unit by the instruction processing unit to re-power on the volatile part and the non-volatile part and restoring the data stored in the non-volatile part to the volatile part.

14. The conversion method according to claim 10 the at least one specific instruction comprises a data backup instruction, a power-off instruction, a power-on instruction and a data restore instruction, the conversion method further comprising:

triggering the data storage unit by the instruction processing unit to store data of the volatile part into the non-volatile part when the instruction processing unit executes the data backup instruction of the third instruction sequence;

triggering the data storage unit by the instruction processing unit to power off the volatile part and the non-volatile part when the instruction processing unit executes the power-off instruction of the third instruction sequence;

triggering the data storage unit by the instruction processing unit to re-power on the volatile part and the non-volatile part when the instruction processing unit executes the power-on instruction of the third instruction sequence; and triggering the data storage unit by the instruction processing unit to restore the data stored in the non-volatile part to the volatile part when the instruction processing unit executes the data restore instruction of the third instruction sequence.

15. The conversion method according to claim 10, wherein the data storage unit comprises a memory circuit and a power controller, and managing the storage state of the data storage unit comprises:

storing data of the volatile part of the memory circuit into the non-volatile part of the memory circuit or restoring the data stored in the non-volatile part to the volatile part by the memory circuit controlled by the instruction processing unit; and powering off or re-powering on the memory circuit by the power controller controlled by the instruction processing unit.

16. The conversion method according to claim 15, wherein the memory circuit comprises a non-volatile static random access memory, a non-volatile dynamic random access memory, or a non-volatile flip-flop.

17. The conversion method according to claim 10, wherein the data storage unit comprises a non-volatile static random access memory, a non-volatile dynamic random access memory, or a non-volatile flip-flop.

18. The conversion method according to claim 10, wherein the at least one specific instruction comprises a plurality of memory-group instructions, and the data storage unit comprises a plurality of memory circuit groups, and managing the storage state of the data storage unit comprises:

managing storage states of the memory circuit groups respectively according to the plurality of memory-group instructions by the instruction processing unit.

19. A computing apparatus, comprising:

a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;

a data storage unit, comprising a volatile part and a non-volatile part;

an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction;

a bus, coupled to the conversion circuit and the instruction processing circuit, wherein the conversion circuit has a mode switching flag, when at least one power management process of an operating system determines to switch an operation mode of the computing apparatus to the power saving mode, the instruction processing circuit executes a corresponding instruction sequence for mode switching and control the conversion circuit to set the mode switching flag through the bus, and the conversion circuit inserts the at least one specific instruction into the second instruction sequence to obtain the third instruction sequence, after the mode switching flag is set with the value indicating that the computing apparatus is in the power saving mode.

20. A computing apparatus, comprising:

a conversion circuit, receiving a first instruction sequence in which each instruction in the first instruction sequence belongs to an instruction set, and combining a second instruction sequence having the same function as the first instruction sequence with at least one specific instruction used for supporting normally-off computing function to reduce power consumption to obtain and output a third instruction sequence, wherein the at least one specific instruction does not belong to the instruction set;

a data storage unit, comprising a volatile part and a non-volatile part;

an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction;

a state memory, having a mode switching flag; and a bus, coupled to the state memory, the conversion circuit and the instruction processing circuit, wherein when at least one power management process of an operating system determines to switch an operation mode of the computing apparatus to the power saving mode, the instruction processing circuit executes a corresponding instruction sequence for mode switching and sets the mode switching flag of the state memory through the bus, and the conversion circuit inserts the at least one specific instruction into the second instruction sequence to obtain the third instruction sequence, after receiving the mode switching signal with the value indicating that the computing apparatus is in the power saving mode according to the mode switching flag checked by the conversion circuit.

21. A computing apparatus, comprising:

a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;

a data storage unit, comprising a volatile part and a non-volatile part;

an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction; and an interrupt controller, coupled to the conversion circuit, wherein the interrupt controller outputs a mode switching signal with a value indicating that the computing apparatus is in the power saving mode to the conversion circuit when a hardware interrupt occurs, and the conversion circuit inserts the at least one specific instruction into the second instruction sequence to obtain the third instruction sequence, after receiving the mode switching signal with the value indicating that the computing apparatus is in the power saving mode.

22. A computing apparatus, comprising:
a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;
a data storage unit, comprising a volatile part and a non-volatile part;
an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction; and
a statistics analyzer, coupled to a hardware module to analyze an operation state of the hardware module and determining whether the statistics analyzer outputs a mode switching signal with a value indicating that the computing apparatus is in the power saving mode to the conversion circuit according to the operation state of the hardware module,
wherein the conversion circuit inserts the at least one specific instruction into the second instruction sequence to obtain the third instruction sequence, after receiving the mode switching signal with the value indicating that the computing apparatus is in the power saving mode.

23. A computing apparatus, comprising:
a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;
a data storage unit, comprising a volatile part and a non-volatile part;
an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction; and
an instruction sequence detector, coupled to the conversion circuit and detecting a predetermined mode switching pattern from the first instruction sequence, wherein
when detecting the predetermined mode switching pattern from the first instruction sequence, the instruction sequence detector outputs a mode switching signal with a value indicating that the computing apparatus is in the power saving mode to the conversion circuit, and
the conversion circuit inserts the at least one specific instruction into the second instruction sequence to obtain the third instruction sequence, after receiving the mode switching signal with the value indicating that the computing apparatus is in the power saving mode.

24. A conversion method for reducing power consumption, comprising:
receiving a first instruction sequence in which each instruction in the first instruction sequence belongs to an instruction set by a conversion unit of a computing apparatus;
combining, in a power saving mode, a second instruction sequence having the same function as the first instruction sequence with at least one specific instruction used for supporting normally-off computing function to reduce power consumption by the conversion unit to obtain and output a third instruction sequence, wherein the at least one specific instruction does not belong to the instruction set;
processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;
when a power management process of an operating system determines to switch an operation mode to the power saving mode, executing a corresponding instruction sequence for mode switching and controlling the conversion unit of the computing apparatus to set a mode switching flag of the conversion unit by the instruction processing unit through a bus; and
inserting the at least one specific instruction into the second instruction sequence to obtain the third instruction sequence by the conversion unit, after the mode switching flag is set.

25. A conversion method for reducing power consumption, comprising:
receiving a first instruction sequence in which each instruction in the first instruction sequence belongs to an instruction set by a conversion unit of a computing apparatus;
combining, in a power saving mode, a second instruction sequence having the same function as the first instruction sequence with at least one specific instruction used for supporting normally-off computing function to reduce power consumption by the conversion unit to obtain and output a third instruction sequence, wherein the at least one specific instruction does not belong to the instruction set;
processing the third instruction sequence and managing a storage state of the volatile part and the non-volatile part of a data storage unit of the computing apparatus according to the at least one specific instruction by an instruction processing unit of the computing apparatus, wherein the data storage unit comprises a volatile part and a non-volatile part;
when at least one power management process of an operating system determines to switch an operation mode of the computing apparatus to the power saving mode, executing a corresponding instruction sequence for mode switching and setting a mode switching flag of a state memory of the computing apparatus through a bus of the computing apparatus by the instruction processing unit; and
inserting the at least one specific instruction into the second instruction sequence to obtain the third instruction sequence by the conversion unit according to the mode switching flag checked by the conversion unit.

26. A conversion method for reducing power consumption, comprising:

receiving a first instruction sequence in which each instruction in the first instruction sequence belongs to an instruction set by a conversion unit of a computing apparatus;

combining, in a power saving mode, a second instruction sequence having the same function as the first instruction sequence with at least one specific instruction used for supporting normally-off computing function to reduce power consumption by the conversion unit to obtain and output a third instruction sequence, wherein the at least one specific instruction does not belong to the instruction set;

processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;

outputting a mode switching signal with a value indicating that the computing apparatus is in the power saving mode to the conversion unit by an interrupt controller of the computing apparatus, when a hardware interrupt occurs; and inserting the at least one specific instruction into the second instruction sequence to obtain the third instruction sequence by the conversion unit, after the conversion unit receives the mode switching signal with the value.

27. A conversion method for reducing power consumption, comprising:

receiving a first instruction sequence in which each instruction in the first instruction sequence belongs to an instruction set by a conversion unit of a computing apparatus;

combining, in a power saving mode, a second instruction sequence having the same function as the first instruction sequence with at least one specific instruction used for supporting normally-off computing function to reduce power consumption by the conversion unit in a power saving mode to obtain and output a third instruction sequence, wherein the at least one specific instruction does not belong to the instruction set;

processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;

analyzing an operation state of a hardware module by a statistics analyzer of the computing apparatus;

determining by the statistics analyzer whether the statistics analyzer outputs a mode switching signal with a value indicating that the computing apparatus is in the power saving mode to the conversion unit, according to the operation state of the hardware module; and inserting the at least one specific instruction into the second instruction sequence to obtain the third instruction sequence by the conversion unit, after receiving the mode switching signal with the value.

28. A conversion method for reducing power consumption, comprising:

receiving a first instruction sequence in which each instruction in the first instruction sequence belongs to an instruction set by a conversion unit of a computing apparatus;

combining, in a power saving mode, a second instruction sequence having the same function as the first instruction sequence with at least one specific instruction used for supporting normally-off computing function to reduce power consumption by the conversion unit in a power saving mode to obtain and output a third instruction sequence, wherein the at least one specific instruction does not belong to the instruction set;

processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;

detecting a predetermined mode switching pattern from the first instruction sequence by an instruction sequence detector of the computing apparatus;

outputting a mode switching signal with a value indicating that the computing apparatus is in the power saving mode to the conversion unit by the instruction sequence detector, when the instruction sequence detector detects the predetermined mode switching pattern from the first instruction sequence; and inserting the at least one specific instruction into the second instruction sequence to obtain the third instruction sequence by the conversion unit, after the conversion unit receives the mode switching signal with the value.

29. A computing apparatus, comprising:

a conversion circuit, receiving a first instruction sequence in which each instruction in the first instruction sequence belongs to an instruction set, and combining, in a power saving mode, a second instruction sequence having the same function as the first instruction sequence with at least one specific instruction used for supporting normally-off computing function to reduce power consumption to obtain and output a third instruction sequence, wherein the at least one specific instruction does not belong to the instruction set;

a data storage unit, comprising a volatile part and a non-volatile part;

an instruction processing circuit, coupled to the conversion circuit and the data storage unit, wherein the instruction processing circuit process the third instruction sequence, and manages a storage state of the volatile part and the non-volatile part of the data storage unit according to the at least one specific instruction; and a power management unit (PMU), coupled to the conversion circuit and the instruction processing circuit, wherein the instruction processing circuit executes a corresponding instruction sequence for operating an operating system (OS), and the OS preserves a state of a process that is interrupted by an interrupt event, an interrupt service routine that serving the interrupt event triggers the PMU to output a mode switching signal with a value indicating that the computing apparatus is in the power saving mode to the conversion circuit, and wherein the conversion circuit inserts the at least one specific instruction into the second instruction sequence to obtain the third instruction sequence according to a mode switching flag after the conversion circuit sets the mode switching flag in the conversion circuit based on the value indicating that the computing apparatus is in the power saving mode.

30. A conversion method for reducing power consumption, comprising:
- receiving a first instruction sequence in which each instruction in the first instruction sequence belongs to an instruction set by a conversion unit of a computing apparatus;
- combining, in a power saving mode, a second instruction sequence having the same function as the first instruction sequence with at least one specific instruction used for supporting normally-off computing function to reduce power consumption by the conversion unit to obtain and output a third instruction sequence, wherein the at least one specific instruction does not belong to the instruction set;
- processing the third instruction sequence and managing a storage state of a volatile part and a non-volatile part of a data storage unit of the computing apparatus according to the at least one specific instruction by an instruction processing unit of the computing apparatus, wherein the data storage unit comprises a volatile part and a non-volatile part;
- executing a corresponding instruction sequence for operating an operating system by the instruction processing unit;
- preserving a state of a process that is interrupted by an interrupt event;
- triggering a power management unit to output a mode switching signal with a value indicating that the computing apparatus is in the power saving mode to the conversion unit by an interrupt service routine that serving the interrupt event;
- setting a mode switching flag in the conversion unit by the conversion unit based on the value;
- checking the mode switching flag by the conversion unit; and
- inserting the at least one specific instruction into the second instruction sequence to obtain the third instruction sequence by the conversion unit according to the set mode switching flag.

* * * * *